United States Patent
Nomura

(10) Patent No.: US 7,783,687 B2
(45) Date of Patent: Aug. 24, 2010

(54) MAP DATA PRODUCT AND MAP DATA PROCESSOR

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 1356 days.

(21) Appl. No.: 10/522,629

(22) PCT Filed: Jul. 30, 2003

(86) PCT No.: PCT/JP03/09650

§ 371 (c)(1), (2), (4) Date: Sep. 21, 2005

(87) PCT Pub. No.: WO2004/012171

PCT Pub. Date: Feb. 5, 2004

(65) Prior Publication Data

US 2006/0167934 A1    Jul. 27, 2006

(30) Foreign Application Priority Data

Jul. 30, 2002    (JP)    ............................. 2002-220922
Jul. 30, 2002    (JP)    ............................. 2002-220923

(51) Int. Cl.
*G06F 17/30* (2006.01)

(52) U.S. Cl. .................... 707/920; 701/1; 701/207; 701/209; 701/212; 345/204; 345/423; 345/581; 345/606

(58) Field of Classification Search ................ 707/609, 707/705, 791, 802, 820; 701/1, 207, 209, 701/212; 345/204, 423, 581, 606
See application file for complete search history.

(56) References Cited

U.S. PATENT DOCUMENTS

| 5,845,228 | A |   | 12/1998 | Uekawa et al. |
| 5,951,622 | A | * | 9/1999  | Nomura ...................... 701/212 |

FOREIGN PATENT DOCUMENTS

| EP | 0 838 663 A2 | 4/1998  |
| EP | 1 184 792 A2 | 3/2002  |
| JP | 4-301515 A   | 10/1992 |
| JP | 6-323861 A   | 11/1994 |
| JP | 8-87234 A    | 4/1996  |

(Continued)

OTHER PUBLICATIONS

European Search Report dated Mar. 13, 2008 (Three (3) pages).

(Continued)

*Primary Examiner*—Fred I Ehichioya
(74) *Attorney, Agent, or Firm*—Crowell & Moring LLP

(57) ABSTRACT

A data product that can be read into a computer or a map data processing apparatus contains map data that includes map-related information related to a map. The map data includes: a structure achieved by dividing the map into a plurality of mesh-like subdivisions and dividing the map-related information into units corresponding to the individual subdivisions; and a structure in which the map-related information is managed in units of subdivision sets each containing a plurality of adjacent subdivisions and the map-related information is used in the map data processing apparatus in units of the individual subdivision sets.

12 Claims, 16 Drawing Sheets

FOREIGN PATENT DOCUMENTS

| | | |
|---|---|---|
| JP | 08-122089 | 5/1996 |
| JP | 9-218047 A | 8/1997 |
| JP | 10-177337 A | 6/1998 |
| JP | 11-174954 A | 7/1999 |
| JP | 11-248474 A | 9/1999 |
| JP | 2000-121371 A | 4/2000 |
| JP | 2001-330461 A | 11/2001 |
| JP | 2002-206938 A | 7/2002 |

OTHER PUBLICATIONS

*NEC Technical Journal*, Vo. 37, No. 5, May 25, 1984, pp. 32-40 entitled "Chiri Joho System Well-Informed Geographer: An Integrated Geographic Information System" by Hiroshi Misawa et al.

* cited by examiner

FIG.6

BLOCK MANAGEMENT TABLE AT LEVEL 1

| DATA # | | DATA NAME |
|---|---|---|
| 1 | | BLOCK MANAGEMENT TABLE SIZE |
| 2 | | NUMBER OF SETS OF BLOCK MANAGEMENT INFORMATION |
| 3 | BLOCK 1 | UPPER END LATITUDE (PRIMARY LATITUDE MESH CODE) |
| 4 | | LOWER END LATITUDE (PRIMARY LATITUDE MESH CODE) |
| 5 | | LEFT END LATITUDE (PRIMARY LONGITUDE MESH CODE) |
| 6 | | RIGHT END LATITUDE (PRIMARY LONGITUDE MESH CODE) |
| 7 | | POINTER TO MESH MANAGEMENT TABLE |
| 8 | BLOCK 2 | UPPER END LATITUDE (PRIMARY LATITUDE MESH CODE) |
| 9 | | LOWER END LATITUDE (PRIMARY LATITUDE MESH CODE) |
| 10 | | LEFT END LATITUDE (PRIMARY LONGITUDE MESH CODE) |
| 11 | | RIGHT END LATITUDE (PRIMARY LONGITUDE MESH CODE) |
| 12 | | POINTER TO MESH MANAGEMENT TABLE |
| 13 | BLOCK 3 | UPPER END LATITUDE (PRIMARY LATITUDE MESH CODE) |
| 14 | | LOWER END LATITUDE (PRIMARY LATITUDE MESH CODE) |
| 15 | | LEFT END LATITUDE (PRIMARY LONGITUDE MESH CODE) |
| 16 | | RIGHT END LATITUDE (PRIMARY LONGITUDE MESH CODE) |
| 17 | | POINTER TO MESH MANAGEMENT TABLE |
| 18 | ⋮ | |
| 19 | BLOCK 16 | UPPER END LATITUDE (PRIMARY LATITUDE MESH CODE) |
| 20 | | LOWER END LATITUDE (PRIMARY LATITUDE MESH CODE) |
| 21 | | LEFT END LATITUDE (PRIMARY LONGITUDE MESH CODE) |
| 22 | | RIGHT END LATITUDE (PRIMARY LONGITUDE MESH CODE) |
| 23 | | POINTER TO MESH MANAGEMENT TABLE |

FIG.7

MESH MANAGEMENT TABLE

| 1 | MESH MANAGEMENT TABLE SIZE |
|---|---|
| 2 | NUMBER OF REFERENCE MESHES MANAGED ALONG LATITUDINAL DIRECTION |
| 3 | NUMBER OF REFERENCE MESHES MANAGED ALONG LONGITUDINAL DIRECTION |
| 4 | LOWER END LATITUDE (PRIMARY LATITUDE MESH CODE) |
| 5 | LEFT END LONGITUDE (FIRST ORDER MESH CODE) |
| 6 | FILE MANAGEMENT TABLE CLASSIFICATION |
| 7 | FILE MANAGEMENT TABLE |

FIG.8

FILE MANAGEMENT TABLE CLASSIFICATION 1 (EXAMPLE)

| | | | |
|---|---|---|---|
| 1 | | | MESH (MESH SET) DATA START POINTER |
| 2 | | | RELATIVE NUMBER ASSIGNED TO LOWER LEFT REFERENCE MESH IN CORE MESH 4 bytes |
| 3 | | | NUMBER OF REFERENCE MESHES SET ALONG LATITUDINAL DIRECTION WITHIN CORE MESH 1 byte |
| 4 | | | NUMBER OF REFERENCE MESHES SET ALONG LONGITUDINAL DIRECTION WITHIN CORE MESH 1 byte |
| 5 | | LEFT END | LATITUDE OF MESH SET AT LOWER END (RELATIVE NUMBER OF REFERENCE MESHES COUNTED FROM LOWER LEFT REFERENCE MESH IN CORE MESH) 1 byte |
| 6 | | | LONGITUDE OF MESH SET AT LEFT END (RELATIVE NUMBER OF REFERENCE MESHES COUNTED FROM LOWER LEFT REFERENCE MESH IN CORE MESH) 1 byte |
| 7 | | | NUMBER OF REFERENCE MESHES SET ALONG LATITUDINAL DIRECTION WITHIN MESH SET (RECTANGULAR AREA SIZE) 1 byte |
| 8 | | | NUMBER OF REFERENCE MESHES SET ALONG LONGITUDINAL DIRECTION WITHIN MESH SET (RECTANGULAR AREA SIZE) 1 byte |
| 9 | | | STORAGE LOCATION |
| 10 | | | CONNECTION / PARTIAL RESTRICTION MESH SET DATA SIZE |
| 11 | LOWER-END LINE | | LEVEL CORRESPONDENCE MESH SET DATA SIZE |
| 12 | | | RELATIVE NUMBER ASSIGNED TO LOWER LEFT REFERENCE MESH IN CORE MESH 4 bytes |
| 13 | | | NUMBER OF REFERENCE MESHES SET ALONG LATITUDINAL DIRECTION WITHIN CORE MESH 1 byte |
| 14 | | | NUMBER OF REFERENCE MESHES SET ALONG LONGITUDINAL DIRECTION WITHIN CORE MESH 1 byte |
| 15 | | ADJACENT TO RIGHT | LATITUDE OF MESH SET AT LOWER END (RELATIVE NUMBER OF REFERENCE MESHES COUNTED FROM LOWER LEFT REFERENCE MESH IN CORE MESH) 1 byte |
| 16 | | | LONGITUDE OF MESH SET AT LEFT END (RELATIVE NUMBER OF REFERENCE MESHES COUNTED FROM LOWER LEFT REFERENCE MESH IN CORE MESH) 1 byte |
| 17 | | | NUMBER OF REFERENCE MESHES SET ALONG LATITUDINAL DIRECTION WITHIN MESH SET (RECTANGULAR AREA SIZE) 1 byte |
| 18 | | | NUMBER OF REFERENCE MESHES SET ALONG LONGITUDINAL DIRECTION WITHIN MESH SET (RECTANGULAR AREA SIZE) 1 byte |
| 19 | | | STORAGE LOCATION |
| 20 | | | CONNECTION / PARTIAL RESTRICTION MESH SET DATA SIZE |
| 21 | | | LEVEL CORRESPONDENCE MESH SET DATA SIZE |
| 22 | | ⋮ | ⋮ |

FIG.9
MESH SET DATA

| 1 | NUMBER OF REFERENCE MESHES |
| --- | --- |
| 2 | OFFSETS TO AND SIZES OF REFERENCE MESH DATA |
| 3 | REFERENCE MESH DATA 1 |
| 4 | REFERENCE MESH DATA 2 |
| 5 | REFERENCE MESH DATA 3 |
| 6 | ⋮ |
| 7 | REFERENCE MESH DATA n |

FIG.10
REFERENCE MESH DATA

| 1 | MESH CODE |
| --- | --- |
| 2 | MESH IDENTIFICATION INFORMATION |
| 3 | CORE MESH IDENTIFICATION INFORMATION |
| 4 | ROUTE INFORMATION LIST IDENTIFICATION INFORMATION |
| 5 | OFFSET INFORMATION |
| 6 | CONNECTION DATA |
| 7 | PARTIAL RESTRICTION DATA |

FIG.11
CONNECTION DATA PORTION

| 1 | SUBJECT NODE INFORMATION 1 |
| --- | --- |
| 2 | ADJACENT NODE INFORMATION 1 |
| 3 | SUBJECT NODE INFORMATION 2 |
| 4 | ADJACENT NODE INFORMATION 2 |
| 5 | ⋮ |
| 6 | SUBJECT NODE INFORMATION n |
| 7 | ADJACENT NODE INFORMATION n |

FIG.12
CONNECTION DATA PORTION (OVERLAP MESH)

| 1 | SUBJECT NODE INFORMATION 1 | SUBJECT NODE ID NO.=0 INVALID NODE FLAG=OFF |
| --- | --- | --- |
| 2 | ADJACENT NODE INFORMATION 1 | |
| 3 | SUBJECT NODE INFORMATION 2 | SUBJECT NODE ID NO.=1 INVALID NODE FLAG=OFF |
| 4 | ADJACENT NODE INFORMATION 2 | |
| 5 | SUBJECT NODE INFORMATION 3 | SUBJECT NODE ID NO.=2 INVALID NODE FLAG=ON |
| 6 | SUBJECT NODE INFORMATION 4 | SUBJECT NODE ID NO.=3 INVALID NODE FLAG=ON |
| 7 | SUBJECT NODE INFORMATION 5 | SUBJECT NODE ID NO.=4 INVALID NODE FLAG=OFF |
| 8 | ADJACENT NODE INFORMATION 5 | |
| 9 | ⋮ | |
| 10 | SUBJECT NODE INFORMATION 2049 | SUBJECT NODE ID NO. = 2048 INVALID NODE FLAG = OFF |
| 11 | ADJACENT NODE INFORMATION 2049 | |

FIG.13

MESH SET DATA

| 1 | NUMBER OF REFERENCE MESHES |
| --- | --- |
| 2 | OFFSETS TO AND SIZES OF REFERENCE MESH DATA |
| 3 | REFERENCE MESH DATA 1 |
| 4 | REFERENCE MESH DATA 2 |
| 5 | REFERENCE MESH DATA 3 |
| 6 | ⋮ |
| 7 | REFERENCE MESH DATA n |

FIG.14

REFERENCE MESH DATA

| 1 | MESH CODE |
| --- | --- |
| 2 | MESH IDENTIFICATION INFORMATION |
| 3 | CORE MESH IDENTIFICATION INFORMATION |
| 4 | OFFSET INFORMATION |
| 5 | LEVEL CORRESPONDENCE TABLE DATA |

FIG.15
LEVEL CORRESPONDENCE DATA PORTION

| 1 | LEVEL CORRESPONDENCE DATA HEADER |
|---|---|
| 2 | NUMBER OF CORRESPONDING LEVELS |
| 3 | CORRESPONDENCE INFORMATION 1 |
| 4 | CORRESPONDENCE INFORMATION 2 |
| 5 | CORRESPONDENCE INFORMATION 3 |
| 6 | ⋮ |
| 7 | CORRESPONDENCE INFORMATION n |

FIG.16
CORRESPONDENCE INFORMATION

| 1 | SUBJECT NODE CORRESPONDENCE INFORMATION |
|---|---|
| 2 | ADJACENT NODE #1 INFORMATION |
| 3 | ADJACENT NODE #2 INFORMATION |
| 4 | ADJACENT NODE #3 INFORMATION |
| 5 | ⋮ |
| 6 | ADJACENT NODE #m INFORMATION |

FIG.17
SUBJECT NODE CORRESPONDENCE INFORMATION

| 1 | NUMBER OF ADJACENT NODES |
|---|---|
| 2 | SUBJECT LEVEL INFORMATION (SUBJECT LEVEL NODE NUMBER) |
| 3 | LOWER-ORDER LEVEL INFORMATION 1 |
| 4 | LOWER-ORDER LEVEL INFORMATION 2 |
| 5 | ⋮ |
| 6 | LOWER-ORDER LEVEL INFORMATION j |

FIG.18
ADJACENT NODE INFORMATION

| 1 | SUBJECT LEVEL ADJACENCY INFORMATION |
|---|---|
| 2 | LOWER-ORDER LEVEL ADJACENCY INFORMATION 1 |
| 3 | LOWER-ORDER LEVEL ADJACENCY INFORMATION 2 |
| 4 | ⋮ |
| 5 | LOWER-ORDER LEVEL ADJACENCY INFORMATION k |

FIG.19

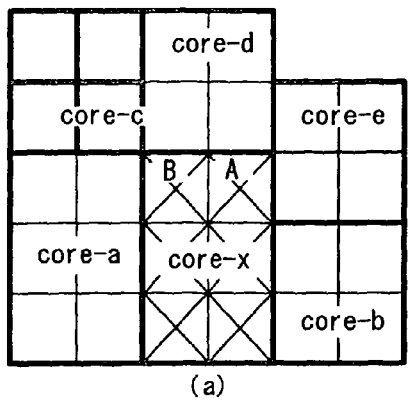

(a)

REFERENCE MESH DATA A

| 1 | MESH CODE | |
|---|---|---|
| 2 | MESH IDENTIFICATION INFORMATION | CORE MESH or OVERLAP MESH |
| 3 | CORE MESH IDENTIFICATION INFORMATION | |
| 4 | ROUTE INFORMATION LIST IDENTIFICATION INFORMATION (UPPER SIDE MESH) | ROUTE INFORMATION LIST DATA: NO (core-d) |
| | ROUTE INFORMATION LIST IDENTIFICATION INFORMATION (LOWER SIDE MESH) | ROUTE INFORMATION LIST DATA: NULL (WITHIN SUBJECT CORE) |
| | ROUTE INFORMATION LIST IDENTIFICATION INFORMATION (LEFT SIDE MESH) | ROUTE INFORMATION LIST DATA: NULL (WITHIN SUBJECT CORE) |
| | ROUTE INFORMATION LIST IDENTIFICATION INFORMATION (RIGHT SIDE MESH) | ROUTE INFORMATION LIST DATA: YES (core-e) |
| 5 | OFFSET INFORMATION | |
| 6 | CONNECTION DATA | |
| 7 | PARTIAL RESTRICTION DATA | |

(b)

REFERENCE MESH DATA B

| 1 | MESH CODE | |
|---|---|---|
| 2 | MESH IDENTIFICATION INFORMATION | CORE MESH or OVERLAP MESH |
| 3 | CORE MESH IDENTIFICATION INFORMATION | |
| 4 | ROUTE INFORMATION LIST IDENTIFICATION INFORMATION (UPPER SIDE MESH) | ROUTE INFORMATION LIST DATA: NO (core-d) |
| | ROUTE INFORMATION LIST IDENTIFICATION INFORMATION (LOWER SIDE MESH) | ROUTE INFORMATION LIST DATA: NULL (WITHIN SUBJECT CORE) |
| | ROUTE INFORMATION LIST IDENTIFICATION INFORMATION (LEFT SIDE MESH) | ROUTE INFORMATION LIST DATA: YES (core-a) |
| | ROUTE INFORMATION LIST IDENTIFICATION INFORMATION (RIGHT SIDE MESH) | ROUTE INFORMATION LIST DATA: NULL (WITHIN SUBJECT CORE) |
| 5 | OFFSET INFORMATION | |
| 6 | CONNECTING AREA DATA | |
| 7 | PARTIAL RESTRICTION DATA | |

(c)

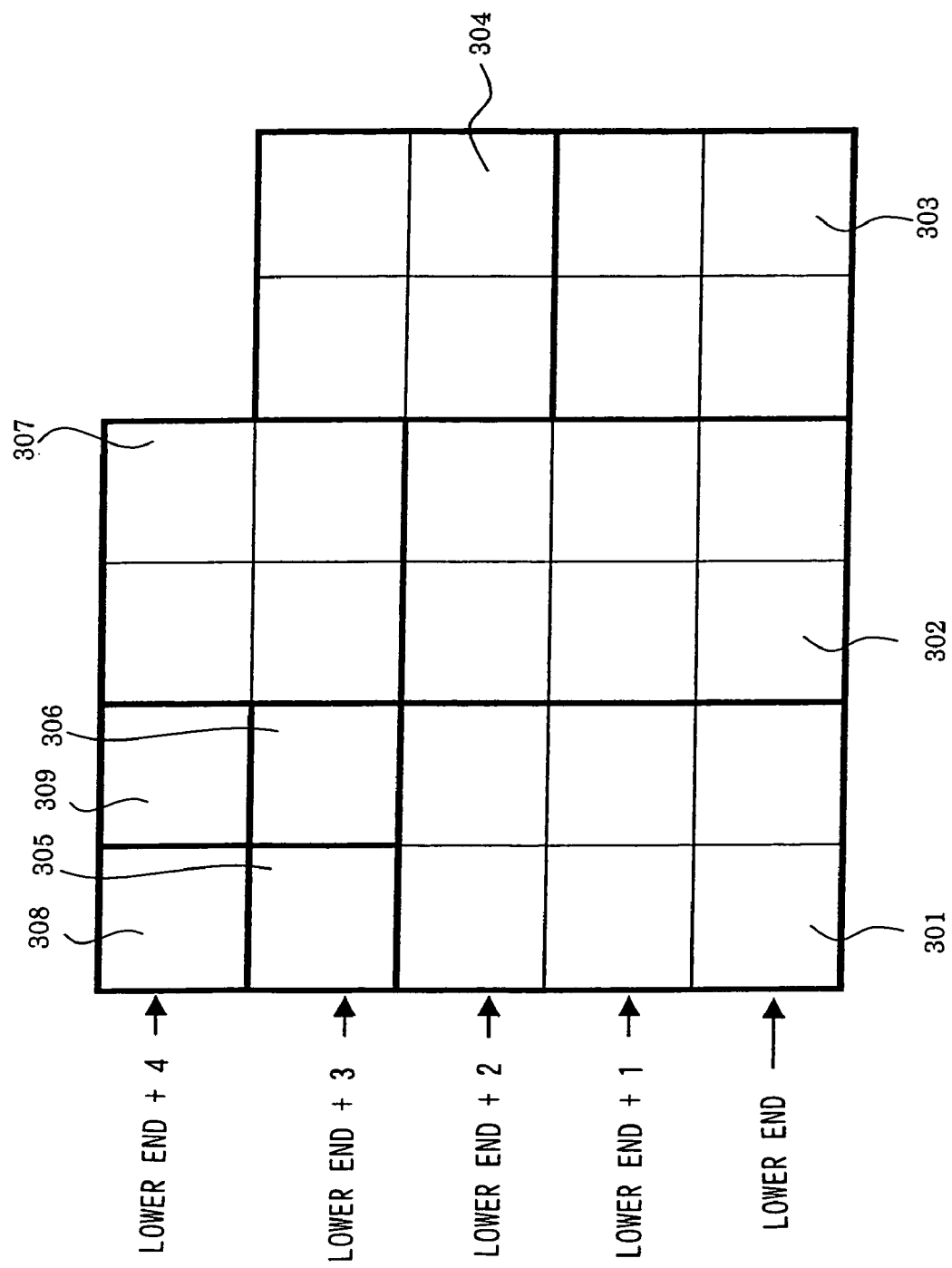

US 7,783,687 B2

MAP DATA PRODUCT AND MAP DATA PROCESSOR

INCORPORATION BY REFERENCE

The disclosures of the following priority applications are herein incorporated by reference:
Japanese Patent Application No. 2002-220922 filed Jul. 30, 2002
Japanese Patent Application No. 2002-220923 filed Jul. 30, 2002

TECHNICAL FIELD

The present invention relates to a map data product and a map data processing apparatus.

BACKGROUND ART

There are navigation systems known in the related art that provide navigation by executing a route calculation and displaying a recommended route. It is also known that route calculation data used in the route calculation are managed in units of map meshes obtained by dividing a map into meshes. Furthermore, it is known that the route calculation data are managed as a plurality of levels of data corresponding to varying scaling factors and that the plurality of levels of route calculation data are individually utilized when executing a given route calculation.

DISCLOSURE OF THE INVENTION

However, there is a problem in that when the route calculation data are read out in units of the individual meshes, the number of seeks that the read head of the read device must undertake is bound to be large to result in a great length of time required for the read.

The present invention provides a map data product and a map data processing apparatus that make it possible to read out with a high degree of efficiency map data provided in a recording medium or the like.

A data product that can be read into a computer or a map data processing apparatus, according to the present invention, contains map data that includes map-related information related to a map. The map data comprises: a structure achieved by dividing the map into a plurality of mesh-like subdivisions and dividing the map-related information into units corresponding to the individual subdivisions; and a structure in which the map-related information is managed in units of subdivision sets each containing a plurality of adjacent subdivisions and the map-related information is used in the map data processing apparatus in units of the individual subdivision sets.

In this data product, it is preferred that the subdivision sets are each constituted with a core portion having at least one subdivision that does not overlap with another subdivision set and an overlap portion having at least one subdivision that is part of a core portion of another subdivision set.

Also, it is preferred that the map-related information corresponding to the overlap portion is generated by reducing the map-related information corresponding to the core portion of the other subdivision set. In this case, it is preferred that: the map-related information is route-related information related to routes on the map used for route calculation; intersection points of roads are designated as nodes; the route-related information comprises sets of subject node information each corresponding to one of a plurality of nodes present on each road and sets of adjacent node information corresponding to nodes connecting with individual subject nodes; the route-related information corresponding to the core portion comprises the subject node information and the adjacent node information; and the map route-related information corresponding to the overlap portion is generated by eliminating the adjacent node information corresponding to specific nodes from the map route-related information corresponding to the core portion.

Also, it is preferred that the map-related information corresponding to each of the subdivision sets is continuously recorded on a recording medium as a single block of information.

Also, it is preferred that the map-related information adopts a structure that allows the map-related information to be used in the map data processing apparatus also in units of the individual subdivisions.

Also, it is preferred that there is further provided a structure that contains management information used to manage the map-related information in units of the subdivision sets; and the map-related information obtained by the map data processing apparatus can be updated in units of the subdivision sets by using the management information.

Also, it is preferred that the map-related information is route-related information related to routes on the map used for route calculation.

Another data product that can be read into a computer or a map data processing apparatus, according to the present invention, contains map data that includes map-related information related to a map. The map data comprises: a structure achieved by dividing the map into a plurality of mesh-like subdivisions and dividing the map-related information into units corresponding to the individual subdivisions; and a structure in which the map-related information is managed in units of subdivision sets each containing a plurality of adjacent subdivisions and the map-related information is used in the map data processing apparatus in units of the individual subdivision sets, and: the subdivision sets are each constituted with a first subdivision and at least one subdivision adjacent to the first subdivision; map-related information corresponding to the first subdivision comprises the map-related information having been divided; and map-related information corresponding to the subdivision adjacent to the first subdivision comprises information generated by reducing the map-related information having been divided.

Another data product that can be read into a computer or a map data processing apparatus, according to the present invention, contains map data that includes map-related information related to a map. The map data comprises: a structure in which the map-related information is provided at a plurality of levels each corresponding to one of various scaling factors; a structure achieved by dividing the map into a plurality of mesh-like subdivisions and dividing the map-related information divided into units corresponding to the individual subdivisions, at each level; a structure in which the map-related information is managed in units of subdivision sets each containing a plurality of adjacent subdivisions and the map-related information is used in the map data processing apparatus in units of the individual subdivision sets; and a structure in which management tables containing information used to manage the subdivision sets at the individual levels are provided, and: the management tables contain information used in an arithmetic operation executed to determine correspondence between subdivision sets at different levels.

In this data product, it is preferred that the management tables each contain information indicating a position of a reference subdivision representing a given subdivision set in combination with information related to a quantity of subdivisions contained in the subdivision set along a vertical direction and information related to a quantity of subdivisions contained in the subdivision set along the horizontal direction. In this case, it is preferred that: the subdivision set has a rectangular shape; and the reference subdivision representing the subdivision set is a subdivision located at a lower left position in the subdivision set. Furthermore, in this case, it is preferred that sets of the information used to manage the subdivision sets are stored sequentially in an order corresponding to a positional arrangement of reference subdivisions representing the individual subdivision sets in reference to the horizontal direction and the vertical direction along which the map is divided.

Also, it is preferred that: the map is divided into a plurality of mesh-like blocks at each of the levels; the plurality of subdivisions are subdivisions obtained by further dividing each of the blocks into smaller partitions; and the management tables are provided each in correspondence to one of the blocks.

Also, it is preferred that the map-related information obtained by the map data processing apparatus can be updated in units of the individual subdivision sets by using the management tables.

Also, it is preferred that: intersection points of roads on the map are designated as nodes; the map-related information contains information related to the nodes; the map-related information divided in correspondence to each subdivision unit further contains different level node correspondence information indicating correspondence between nodes in the subdivision and corresponding nodes at another level; and the correspondence between nodes at different levels can be ascertained based upon correspondence between the subdivision set and a subdivision set at the other level and the different level node correspondence information for subdivisions constituting the subdivision set.

Also, it is preferred that the map-related information is route-related information related to routes on the map used for a route calculation.

It is preferred that the above data product is embodied as a recording medium having recorded therein the map data.

A map data processing apparatus according to the present invention comprises: a recording medium drive unit at which a recording medium embodying a data product according to claim 10 or 11 is loaded; and a processing unit that executes map data processing based upon the map data recorded in the recording medium.

In this map data processing apparatus, it is preferred that if the map-related information is route-related information related to routes on the map used for a route calculation, the processing unit executes a route calculation based upon the route-related information recorded in the recording medium.

BRIEF DESCRIPTION OF THE DRAWINGS

FIG. 6 shows a block management table;
FIG. 7 shows the content of a mesh management table;
FIG. 8 shows in detail a file management table;
FIG. 9 shows mesh set data constituting connection partial restriction data;
FIG. 10 shows the contents of the reference mesh data in the connection/partial restriction data;
FIG. 11 shows in detail connection data portion;
FIG. 12 shows the connection data portion in an overlap mesh;
FIG. 13 shows mesh set data constituting level correspondence data;
FIG. 14 shows the contents of reference mesh data in the level correspondence data;
FIG. 15 shows in detail the level correspondence data;
FIG. 16 shows in detail the correspondence information;
FIG. 17 shows in detail subject node correspondence information;
FIG. 18 shows in detail adjacent node correspondence information;
FIG. 19 presents an illustration provided to facilitate an explanation of route information list identification information;
FIG. 24 illustrates how mesh sets may be managed by using a file management table.

BEST MODE FOR CARRYING OUT THE INVENTION

Figure 1:
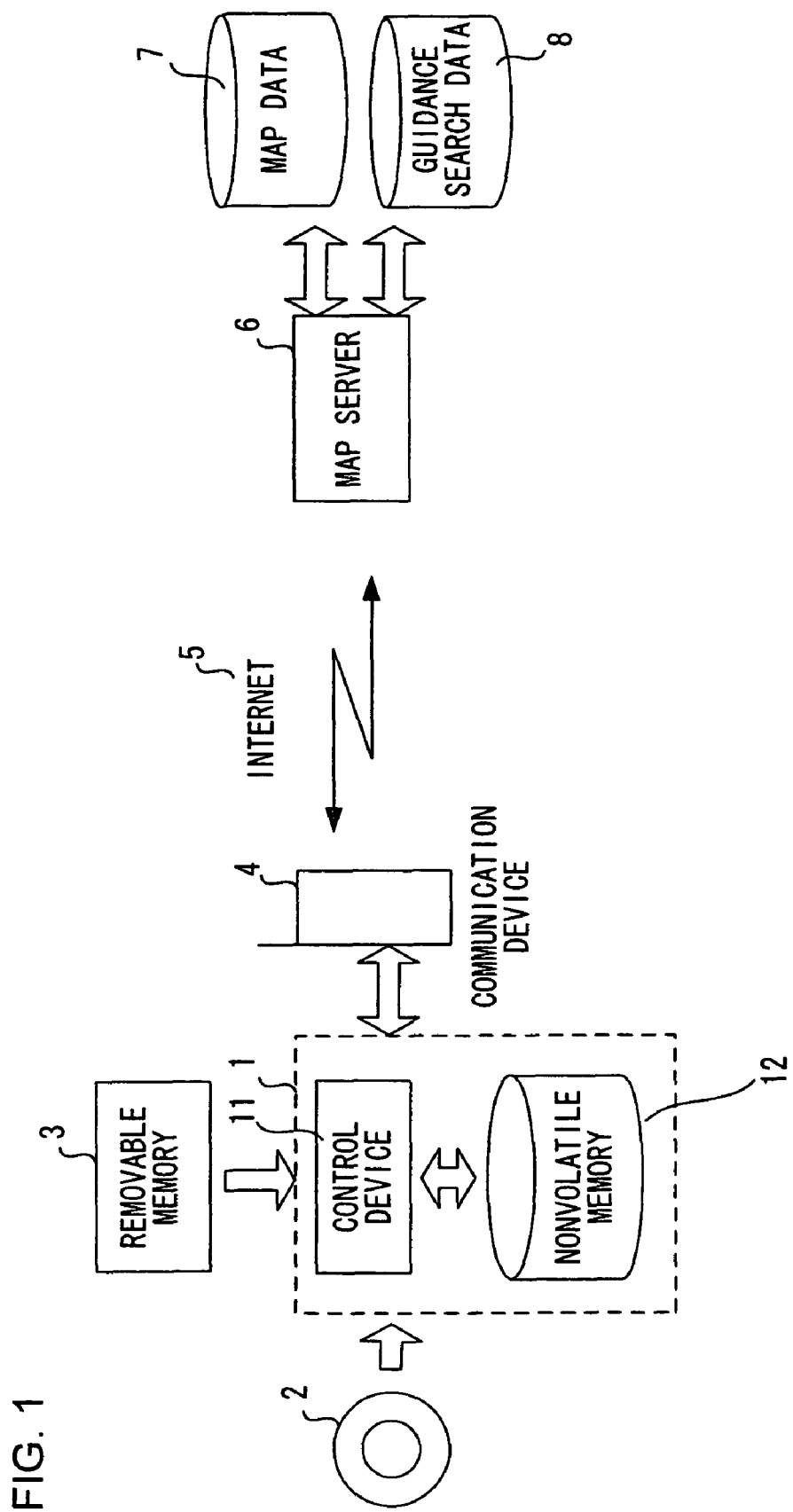
FIG. 1 shows how map data are exchanged.

FIG. 1 illustrates how map data such as map display data and route calculation data are exchanged in an embodiment. An on-vehicle navigation system 1 reads map data, management information, guidance search data and the like from a recording medium 2 which may be a CD ROM or a DVD ROM. It receives update data to be used to update the map data and the like from a removable memory 3. The removable memory 3 is a detachable recording medium having recorded therein the update data or the like to be used to update part of the map data.

In addition, the navigation system 1 can be connected to a communication device 4 such as a portable telephone. The navigation system 1 can be connected to the Internet 5 via the communication device 4 and can be further connected with a map server 6 via the Internet 5. At the map server 6, map data from old versions up to and including the latest version of map data, are held at a map database 7, and guidance search data from old versions up to and including the most recent guidance search data, are held at a guidance search database 8. Thus, the map server 6 is capable of providing update data to be used to update part of the map data to the navigation system 1 via the Internet 5. It is to be noted that the guidance search data contain position information indicating the positions of POIs and the like and attribute information indicating the specific types, the names and the like of the POIs and the like.

The navigation system 1 includes a control device 11 and a nonvolatile memory 12. The control device 11 is constituted with a microprocessor and its peripheral circuits. The nonvolatile memory 12 is a nonvolatile memory such as a hard disk or a flash memory installed inside the navigation system 1. The nonvolatile memory 12 may be any type of storage device as long as data written therein are retained even when the power to the navigation system 1 is turned off.

Once the recording medium 2 is loaded into the navigation system 1, it remains loaded in the navigation system 1 until it is replaced with a new recording medium 2. Accordingly, it may be referred to as a fixed medium as opposed to the removable memory 3. The map database 7 and the guidance search database 8, which hold all the versions of map data and guidance search data, from the oldest to the most recent, are databases holding mother data. Using the data at the map database 7 and the guidance search database 8, the map server 6 can prepare a recording medium 2 having recorded therein initial (pre-update) map data or a removable memory 3 having stored therein update data to be used for data update.

Figure 2:
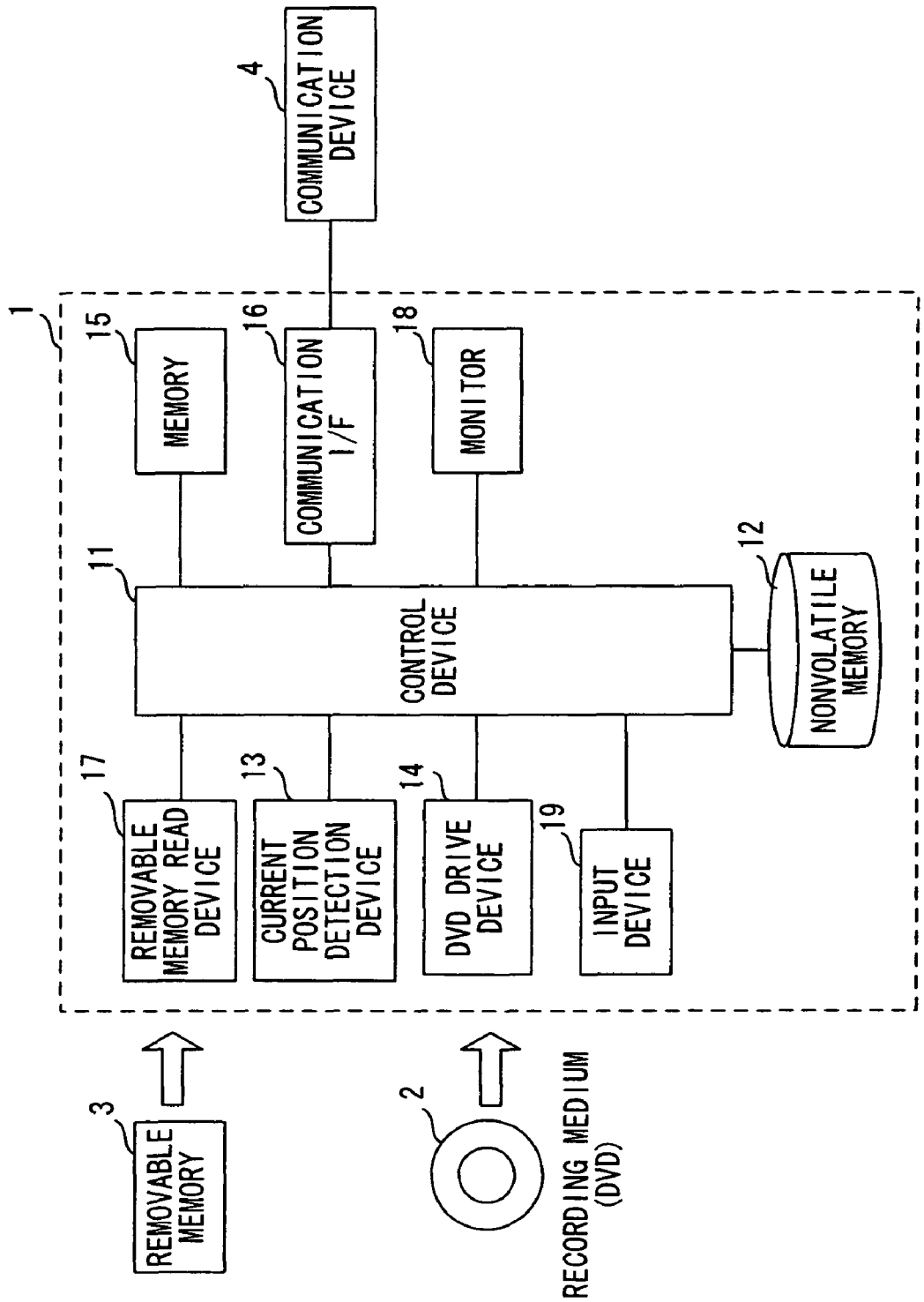
FIG. 2 is a block diagram of an on-vehicle navigation system.

FIG. 2 is a block diagram of the on-vehicle navigation system 1. The navigation system 1 comprises the control device 11, the nonvolatile memory 12, a current position detection device 13, a DVD drive device 14, a memory 15, a communication interface 16, a removable memory read device 17, a monitor 18 and an input device 19.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like in the recording medium 2 loaded therein. In the embodiment, the recording medium 2 is a DVD ROM. However, the recording medium 2 may be a CD ROM or another type of recording medium.

The memory 15 is used to store the vehicle position information detected with the current position detection device 13 and the like and also to store node information, link information and the like of the nodes and the links on a recommended route calculated by the control device 11. In addition, a mesh management table which is to be detailed later is stored in the memory 15. The memory 15 constitutes a working area of the control device 11. The communication interface 16 is used to achieve a connection with the communication device 4. The use of a portable telephone and an Internet connection are enabled via the communication interface 16. Data in the removable memory 3 can be read with the removable memory read device 17 at which the removable memory 3 is loaded.

The monitor 18 is a display device at which a map, a recommended route and various types of information are displayed. The monitor 18 may be provided as an integrated part of the navigation system main unit or it may be provided as a separate casing. In addition, the monitor 18 disposed at an isolated position may be connected to the navigation system main unit through a cable or the like. Through the input device 19, the destination for the vehicle and the like are entered when conducting a route search. It may be constituted as a remote-control unit or it may be constituted as a touch panel disposed on the screen at the monitor 18. The control device 11 executes various types of navigation processing such as road map display, route calculation (route search) and route guidance by using the current vehicle position information detected with the current position detection device 13, the map data stored in the recording medium 2 or the nonvolatile memory 12. It is to be noted that a program of the various types of processing executed by the control device 11 is installed in a ROM (not shown) provided inside the control device 11.

-Map Data Structure-

The data structure adopted in the map data mentioned above is now explained in further detail. The map data are information related to maps and include background (for map display) data, locator data, route calculation data and guidance data (information indicating intersecting point names, node names, directional terms, directional guidance facility information and the like). The background data are used to display a background of a road or a background in a road map. The locator data are used to specify the current vehicle position for map matching and the like. The route calculation, which are network data constituted with branching information and the like not directly relevant to the specific road shapes, are mainly used when calculating a recommended route (when executing a route search). The guidance data include the names of intersecting point and the like, and are used to provide guidance for the driver or the like along the recommended route based upon the calculated recommended route.

The map data are managed based upon a concept that they are provided at different levels in blocks and meshes in the embodiment. In the embodiment, the map data are divided into seven different levels of data, with each level corresponding to a specific scaling factor. Level 0 corresponds to the scaling factor at which the map is provided with the most detail, and at level 6, the map is provided as the widest-area map. While the different levels of map data are provided at varying scaling factors, a common area is covered by the various levels of map data. Namely, supposing that the subject area is the entire nation of Japan, map data of the entire nation of Japan are provided at each level with a scaling factor different from the scaling factors corresponding to the other levels. For instance, at level 0, map data of the entire nation of Japan are provided at a scaling factor of $1/6250$, at level 1, map data of the entire nation of Japan are provided at a scaling factor of $1/25,000$, at level 2, map data of the entire nation of Japan are provided at a scaling factor of $1/100,000$, at level 3, map data of the entire nation of Japan are provided at a scaling factor of $1/400,000$, at level 4, map data of the entire nation of Japan are provided at a scaling factor of $1/1,600,000$, at level 5, map data of the entire nation of Japan are provided at a scaling factor of $1/6,400,000$, and at level 6, map data of the entire nation of Japan are provided at a scaling factor of $1/128,000,000$. In other words, seven sets of map data are provided in correspondence to levels 0 to 6.

Figure 3:
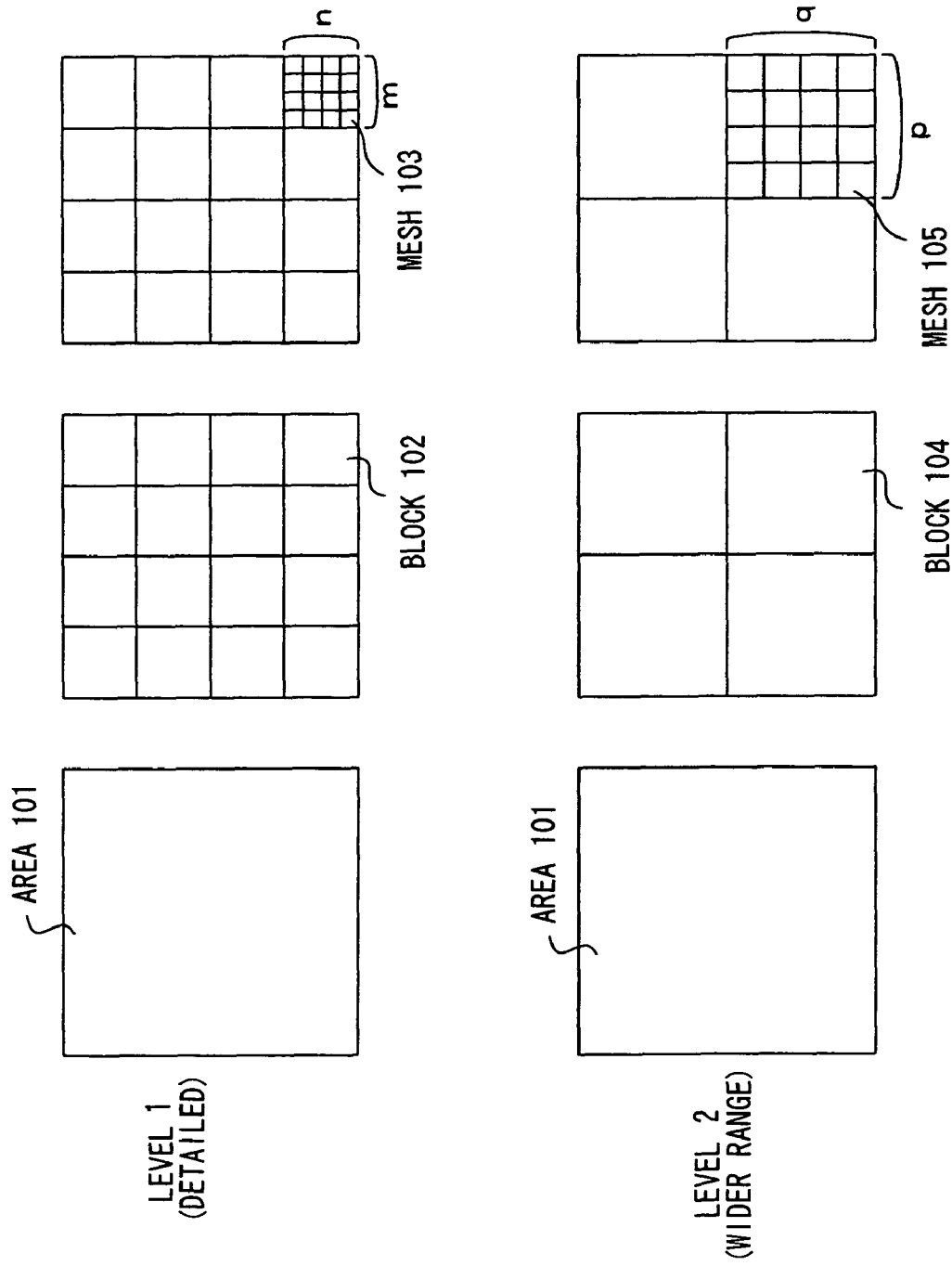
FIG. 3 is a conceptual diagram illustrating the relationships among the levels, the blocks and the meshes of the map data.

FIG. 3 is a conceptual diagram provided to facilitate an explanation of the relationships among the map data levels, blocks and meshes. FIG. 3 shows map data at levels 1 and 2 as an example. Reference numeral 101 indicates the subject area covered by the map data. Assuming that the map data cover the entire nation of Japan, the area 101 is a range that contains the entire nation of Japan. The same range of subject area is covered at levels 1 and 2. At level 1, the area 101 is managed as a plurality of blocks 102, i.e., 4×4=16 blocks. Each block 102 is divided into a plurality of meshes 103 and is managed with the meshes. In the embodiment, the data in the block are managed as m×n sets of mesh data. The blocks 102 of map data at the same level are each divided into m×n meshes.

At level 2, the area 101 is managed with a plurality of blocks 102, i.e., 2×2=4 blocks. Each block 104 is divided into a plurality of meshes 105 and is managed with the meshes. In the embodiment, the data in the block are managed as p×q sets of mesh data. The blocks 104 of map data at the same level are each divided into p×q meshes.

At levels 1 and 2, the area 101 is divided into different numbers of blocks and the individual blocks are divided into different numbers of meshes, since different volumes of data are handled at level 2 with a smaller scaling factor (a larger denominator) providing a wider area map and at level 1 with a larger scaling factor (a smaller denominator) providing a more detailed map compared to level 2. Namely, the map data are divided as appropriate in correspondence to the volume of data handled at each level. However, at a given level, the size of the individual blocks and the size of the individual meshes remain constant. It is to be noted that the numbers of blocks that the area 101 is divided into at the two levels in FIG. 3 simply represent an example and the area 101 may be divided into different numbers of blocks.

The direction along which the map data are divided vertically corresponds to the latitudinal direction, whereas the direction along which the map data are divided horizontally corresponds to the longitudinal direction. The terms "blocks" and "meshes" in this context are used for convenience in the explanation of the embodiment, and other terms may be used as well. Meshes may instead be referred to as parcels, or blocks may be referred to as first division units and meshes may be referred to as second division units. In addition, the blocks and meshes may be considered to be units obtained by geographically dividing the data.

-Route Calculation Data-

The following is an explanation of the route calculation data included in the map data. As described earlier, the route calculation data are managed in units of the individual meshes into which the data are divided. A concept of "mesh sets" is further introduced in the embodiment.

Figure 4:
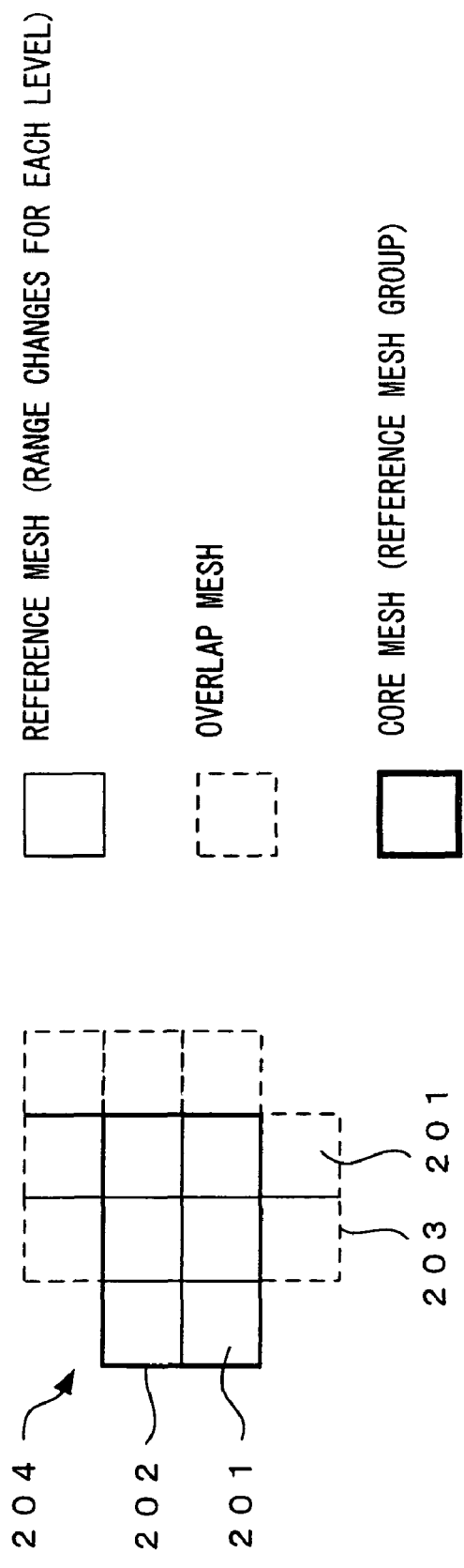
FIG. 4 illustrates the concept of a mesh set.

FIG. 4 illustrates the concept of "a mesh set". Reference numeral 201 indicates each of the meshs explained earlier. Hereafter, the individual meshes are each referred to as a reference mesh. A unit constituted of a group of reference meshes 201 is referred to as a core mesh 202. In the example presented in FIG. 4, six adjacent reference meshes 201 constitute the core mesh 202. Reference meshes 201 indicated with dotted lines surround the core mesh 202. These surrounding reference meshes are collectively referred to as an overlap mesh 203. The core mesh 202 and the overlap mesh 203 together constitute a mesh set 204.

The number of reference meshes 201 constituting the core mesh 202 varies among individual mesh sets 204. While six reference meshes 201 constitute the core mesh 202 in the example presented in FIG. 4, a mesh set 204 may be constituted with a single reference mesh 201 or a plurality of reference meshes 201. In addition, the shape of the core mesh 202 is rectangular (quadrangular) in the embodiment. However, the core mesh 202 may take on an L-shape instead of a rectangular shape. Namely, a mesh set may take on any shape formed with a plurality of adjacent reference meshes 201, although a rectangular shape is the most desirable.

The core meshes 202 are set inside each block without any of them overlapping with other core meshes or forming any gap from the neighboring core meshes. A reference mesh constituting the overlap mesh 203 set around a given core mesh 202 is part of the core mesh in another mesh set. In addition, it may also be part of the overlap mesh of another mesh set. It is to be noted that there may be mesh sets each containing a core mesh constituted with a single reference mesh and an overlap mesh constituted with a single reference mesh or a plurality of reference meshes.

The data corresponding to each reference mesh are referred to as mesh data. The route calculation data are managed in units of individual sets of mesh data each corresponding to a reference mesh. The mesh data in each reference mesh constituting an overlap mesh are generated by culling (thinning out) or reducing the mesh data in the corresponding reference mesh constituting a core mesh in another mesh set. Namely, the mesh data in the overlap mesh are more coarse data, the volume of which is smaller than that of the mesh data in the core mesh. This point is to be explained in further detail later.

As described above, the route calculation data are managed in units of individual reference meshes and are further managed in units of individual mesh sets. The route calculation data managed in units of mesh sets are stored in the recording medium 2 in units of the individual mesh sets. The route calculation data stored in the recording medium 2 in units of mesh sets can be successively read out from the recording medium 2 in units of individual mesh sets. Thus, the number of seeks that the read head of the DVD drive device has to undertake is greatly reduced to realize speedier processing, compared to processing during which data managed in units of meshes are read out in units of individual meshes. In principle, the data managed in units of individual mesh sets are stored in the order of the core mesh data and then the overlap mesh data. In addition, mesh data can be read out from the reference mesh position of an arbitrary reference mesh constituting a mesh set in some applications.

It is to be noted that the concept of "mesh sets" is introduced in conjunction with the route calculation data as described above in the embodiment. It is not crucial that the concept of "mesh sets" be adopted in conjunction with map display data used to display a map at the monitor 18, since mesh data over a range corresponding to the size of the display screen at the monitor 18 simply need to be read as map display data. In other words, the mesh data stored sequentially along a specific direction, e.g., from east to west, simply need to be read out sequentially in the order they are stored.

In the case of route calculation data, on the other hand, an efficient read is not always achieved by reading mesh data along a specific direction such as east to west. For instance, a higher degree of efficiency may be achieved in the route calculation if mesh sets are formed along a major artery. In this embodiment, mesh sets which are optimal for the route calculation are set as necessary at individual locations. The mesh sets may be manually set based upon, for instance, experience, or they may be set so as to achieve the most efficient mesh set makeup through computer simulation. Alternatively, they may be set in conformance to a specific rule. According to such a specific rule, mesh sets may be set along a major artery or an express highway, as described earlier, or they may be set in correspondence to administrative zones such as prefectures and municipalities.

-Management of Mesh Sets-

Next, an explanation is given on how the mesh sets described above are managed. As explained above, the route calculation data are managed as different levels of data which are further divided into units on blocks, mesh sets and reference meshes. The route calculation data are prepared as mesh data in the individual reference meshes. Simply put, the blocks are managed by using a block management table and mesh sets in each block are managed by using a mesh management table.

Figure 5:
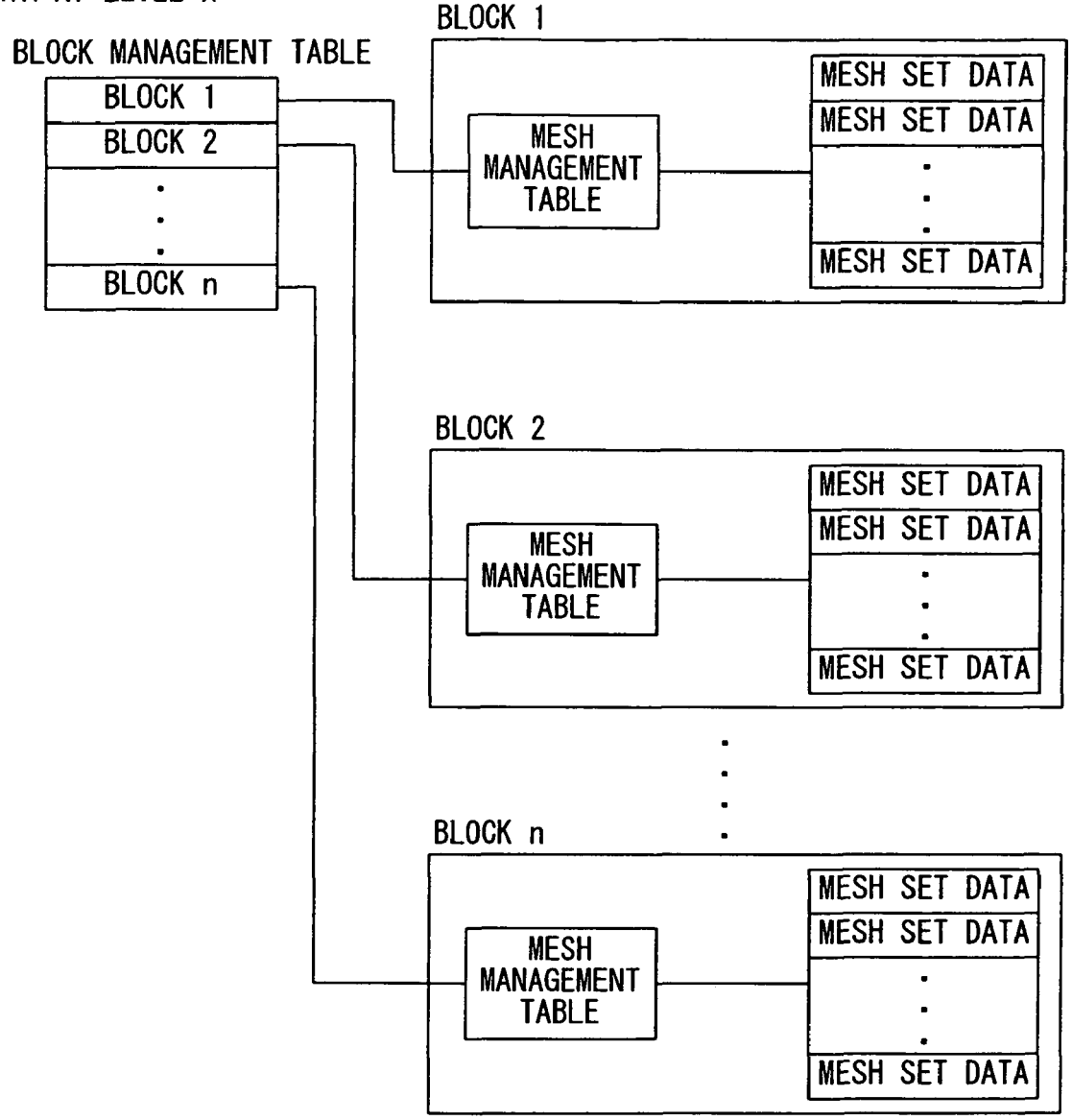
FIG. 5 schematically illustrates the relationship among the block management table, the mesh management tables and the actual data, i.e., mesh set data.

FIG. 5 schematically illustrates the relationship among the block management table, the mesh management tables and the actual data, i.e., mesh set data. The term "mesh set data" in this context refers to a group of mesh data in the reference meshes constituting a mesh set. The figure indicates that a single block management table is provided in correspondence to the data at level x. The block management table contains information related to all the blocks at the level. For instance, the data at level 1 in FIG. 3 are divided into 16 blocks, and accordingly, there are 16 sets of block information in correspondence. At level 2, four blocks at level 1 constitute a single block and accordingly, there are four sets of block information in correspondence to the four blocks. FIG. 5 further indicates that a mesh management table is provided in correspondence to each block.

Such mesh management tables are used to manage the individual mesh sets. For instance, the access to the recording medium 2 and the nonvolatile memory 12 to obtain mesh set data and the correspondence between mesh sets at different levels are all managed by using the mesh management tables. To be more precise, the mesh management tables contain information used to manage the mesh sets, and the control device 11 manages the mesh sets by using these tables.

FIG. 6 shows the block management table at level 1. As data #1 "block management table size", the data size of the block management table (from data #1 through data number 23) is stored. The data size is indicated as a number of words with each word corresponding to two bytes. As data #2 "number of sets of block management information", the number of sets of block management information in the block management table is stored. Since there are 16 blocks at level 1, as shown in FIG. 3, "16" is stored as data #2. As data #3 to #6, latitudinal and longitudinal values indicating the range of the corresponding block on the map are stored. A value obtained by subtracting 100 from the actual longitude is stored as the longitudinal value and a value obtained by multiplying the actual latitude with 3/2 is stored as a latitudinal value. For instance, the value 36 is stored to indicate a long. 136° E and (33+20/60)×(3/2)=50 is stored to indicate a lat. 33° 20' N. As data #7 "pointer to mesh management table", identification information indicating whether the corresponding mesh management table is stored in the recording medium 2 or the nonvolatile memory 12 and the access address of the mesh management table are stored. The contents of these data are to be described in further detail later.

FIG. 7 shows the contents of a mesh management table which is accessed by referencing "pointer to mesh management table" in the block management table. As data #1 "mesh management table size" the data size of the mesh management table (data #1 through #7) is stored. The data size is indicated with a number of words. As data #2 "number of reference meshes managed along latitudinal direction", the number of reference meshes set along the latitudinal direction that are managed with this table is stored. The value n×4 is stored as data #2 at level 1 in FIG. 3. As data #3 "number of reference meshes managed along longitudinal direction" the number of reference meshes set along the longitudinal direction that are managed with the table is stored. In the case of the block 102 at level 1 in FIG. 3, there are n reference meshes set along the south-north direction and m meshes set along the east-west direction and thus, n and m are respectively set as "number of reference meshes managed along latitudinal direction" and "number of reference meshes managed along longitudinal direction".

Data #4 and #5 "lower end latitude" and "left end longitude" indicate the position of the lower left reference mesh among meshes managed with a file management table which is to be explained next. Values calculated as explained earlier are stored as the latitudinal and longitudinal values. It is to be noted that the position of a reference mesh is indicated by the latitude on the lower side (south side) of the reference mesh, and the longitude of the reference mesh on the left side (west side). Data #6 "file management table classification" indicates the type of the particular file management table. For instance, the value 0 is stored if there are only background data, whereas the value 1 is entered if the route calculation data are managed in units of mesh sets. In data #7 "file management table", information such as the sizes of the individual mesh sets is contained as explained below.

FIG. 8 shows in detail a file management table classified as type 1. Each row of reference meshes set along the west to east direction is handled as one line and the individual lines are managed starting with the lower-end line and proceeding toward the upper-end line. Within each line, the meshes are managed in the order starting with the left end (west end) mesh and moving toward the right end (east end) mesh. However, the mesh sets, each constituted with a plurality of reference meshes, are managed based upon the positions of the lower left reference meshes in the core meshes of the individual mesh sets. Namely, if the lower left reference mesh in the core mesh of a given mesh set is in the lower-end line, the mesh set is managed as data in the lower-end line in the file management table. A lower left reference mesh is a reference mesh representing a mesh set. If there are a plurality of mesh sets with their lower left reference meshes in the lower-end line, these mesh sets are managed from left end (west end). In other words, the mesh sets are managed in the order in which their lower left reference meshes are located relative to the longitudinal and the latitudinal directions.

As data #1 "mesh (mesh set) data start pointers" in FIG. 8, the addresses at the recording medium 2 of the left end mesh set data in the individual lines are stored. In the case of the lower-end line, the address at the recording medium 2 of the mesh set in the block that is first recorded into the recording medium 2 is stored. Data #2 indicates a relative number of the lower left reference mesh in the core mesh. The relative number is set for a given reference mesh by assigning a value of 1 to the lower left reference mesh in the block and designating a higher number as the reference mesh is located further to the right within the line and further upward from the lower-end line, relative to the lower left reference mesh in the block.

Data #3 indicates the number of reference meshes set along the latitudinal direction within the core mesh. Data #4 indicates the number of reference meshes set along the longitudinal direction within the core mesh. As described earlier, the mesh sets assume a rectangular shape in the embodiment. Accordingly, the number of reference meshes constituting the subject core mesh can be calculated by multiplying the value indicated in data #3 with the value indicated in data #4. If a core mesh does not take on a rectangular shape, these values make it possible to estimate an approximate range of the core mesh.

Data #5 indicates the lower end latitude (the relative number of reference meshes counted from the lower left reference mesh in the core mesh) of the mesh set including the overlap mesh. Data #6 indicates the left end longitude (the relative number of reference meshes counted from the lower left reference mesh in the core mesh) of the mesh set including the overlap mesh. Data #7 indicates the number of reference meshes (the rectangular area size) set along the latitudinal direction inside the mesh set including the overlap mesh. Data #8 indicates the number of reference meshes (the rectangular area size) set along the longitudinal direction inside the mesh set including the overlap mesh. As data #9, information indicating the storage location of the mesh set data is entered. If the mesh set data have never been updated, information indicating that the mesh set data are stored in the recording medium 2 is stored as data #9. The storage addresses of individual sets of mesh set data can be determined by adding the sizes of the mesh set data which are stored sequentially to the contents of data #1 "mesh (mesh set) data start pointers". If a particular set of mesh set data has been updated, information indicating that the mesh set data are stored in the nonvolatile memory 12 and the address of the mesh set data in the nonvolatile memory 12 are entered. It is to be noted that the name of the updated file may be entered instead of the address. Data #10 indicates the data size of the connection/partial restriction mesh set data. As data #11, the data size of the level correspondence mesh set data is entered.

Data #2 through #11 constitute management information (management data) corresponding to a single mesh set. Data #12 through #21 constitute management information for the mesh set adjacent to the first mesh set to the right. Then, the management information for the mesh set adjacent to the second mesh set to the right is provided. After the management information for the mesh set at the right end (east end), the management information for the mesh set in the next line up (north by one line) is stored starting from the left end (west end) and moving on toward the right end (east end) in a similar manner. Since the core meshes in mesh sets are each constituted with a plurality of reference meshes, there may be a line in which no lower left reference mesh of any core mesh is present. No mesh set management information is provided for such a line.

FIG. 24 illustrates how mesh sets are managed by using a file management table. Reference numerals 301 through 309 each indicate the core mesh of a mesh set. The lower left reference meshes in the core meshes 301, 302 and 303 are all in the lower-end line. The mesh set, which includes the core mesh 301, is managed as the left end mesh set in the lower-end line. The mesh set adjacent to the left end mesh set to the right includes the core mesh 302, and adjacent to this mesh set to the right is the mesh set that includes the core mesh 303. Since no lower left reference mesh of a core mesh is present in the lower end+1 line, the file management table contains no management data in correspondence to this line. As the lower left reference mesh of the core mesh 304 is present in the lower end+2 line, the mesh set containing the core mesh 304 is managed as the left end mesh set in the lower end+2 line. Likewise, the mesh set containing the core mesh 305 at the left end, then the mesh set containing the core mesh 306 and the mesh set containing the core mesh 307 are managed in this order in the lower end+3 line, and the mesh set containing the core mesh 308 at the left end and the mesh set containing the core mesh 309 are managed in this order in the lower end+4 line.

-Mesh Set Data-

Next, mesh set data are explained. A set of mesh set data is a group of mesh data in the reference meshes constituting a mesh set. As explained earlier, the route calculation data are managed as mesh data corresponding to the individual reference meshes. The route calculation data are divided into connection/partial restriction data and level correspondence data.

FIG. 9 shows mesh set data constituting the connection/partial restriction data. A given set of mesh set data is stored either in the recording medium 2 or the nonvolatile memory 12 in the form of the data block shown in FIG. 9. Data #1 "number of reference meshes" indicates the sum of reference meshes constituting the mesh set. The value indicating the total sum of the number of all the reference meshes constituting the core mesh and the number of all the reference meshes constituting the overlap mesh is entered as data #1. Reference mesh data, the number of sets of which matches this sum, are then provided as part of the mesh set data. Data #2 indicates the offset and the sizes of the individual sets of reference mesh data. Data #2 contains offsets and size fields, the number of which corresponds to the number of sets of reference meshes. Data #3 through #7 are the reference mesh data. The mesh data in the n reference meshes are provided sequentially as data #3 through #7.

-Connection Data Portion-

FIG. 10 shows the contents of the reference mesh data constituting the connection/partial restriction data. Data #1 indicates a mesh code. The mesh code, which is information used to identify each reference mesh, is determined based upon, for instance, the latitude/longitude of the reference mesh at the lower left corner. Values determined by executing a calculation similar to that executed to determine the latitudinal/longitudinal mesh code in the block management table in FIG. 6 may be used in combination. Data #2 is mesh identification information. This information is used to identify whether the subject reference mesh data correspond to a reference mesh contained in the core mesh or a reference mesh which is part of the overlap mesh. Data #3 is core mesh identification information, which is used when the subject reference mesh data are in a reference mesh in the overlap mesh. A plurality of meshes with a specific mesh code may exist as over lap meshes surrounding a plurality of core meshes at a given level. Accordingly, the mesh code of the lower left reference mesh in the specific core mesh to which the reference mesh in the overlap mesh belongs is set as data #3 so as to clarify the exact mesh set that contains the particular overlap mesh.

Data #4 is route information list identification information. This information indicates whether or not there is a route information list relating the core mesh containing the subject reference mesh to an adjacent core mesh. The route information list identification information is to be explained in further detail later. Data #5 is offset information. The offset information indicates a value representing the offset relative to the start of the partial restriction data. Namely, an offset value corresponding to the size of the connection data portion is entered. Data #6 is the connection data. Data #7 is the partial restriction data. As the partial restriction data, all the restriction information that may conceivably be set at each link is compiled.

FIG. 11 shows in detail the data #6 in FIG. 10, i.e., the connection data. In the embodiment, roads are expressed based upon a concept whereby each road is constituted with a link string containing a plurality of links connecting nodes. Nodes are points such as intersection points, and points that are specially set on the roads. The links are equivalent to road portions between the individual nodes, and a link string represents a road constituted with a plurality of links. The connection data are connection information indicating node connections. The connection data include subject node information corresponding to each node present on a given link string and adjacent node information of each node connecting with the subject node. As the subject node information and the adjacent node information, the positional coordinates of the individual nodes are stored.

The following information is included as the subject node information in addition to the information indicating the positional coordinates:

(1) identification information used to identify a "regular higher-order connecting node" or a "terminal higher-order connecting node (a connecting node at the higher-order level by one, at which the validity of the route is assured)", which is attached to the subject node information corresponding to a node at a lower-order level;

(2) identification information attached to the subject node information of a node at a lower-order level, which indicates whether or not the node is present in the route information list data;

(3) a higher-order node present/absent flag indicating the presence/absence of a higher-order node over up to four higher-order levels, attached to the subject node information on a node at a lower-order level; and (4) an "invalid node flag" attached to the subject node information. If the invalid node flag is on, the subject node information is left but the corresponding "adjacent node information" is deleted. These measures are taken since overlap meshes (containing different subject nodes) that share the same mesh code need to be held in correspondence to various core meshes and the nodes and the links in such overlap meshes and the matching nodes and links in reference meshes with the same mesh codes in core meshes (all the subject nodes are valid) need to share identical ID numbers.

FIG. 12 shows the connection data portion of an overlap mesh. The connection data of overlap meshes may differ from the connection data in core meshes. Namely, the connection data in the overlap meshes may be coarser than those in the core meshes. For this reason, the mesh data in the reference mesh constituting a core mesh at the same position are copied and a flag indicating whether or not each subject node is to remain valid or be made invalid is set. In the example presented in FIG. 12, the invalid node flag is on in subject node information 3 assigned with data #5 and subject node information 4 assigned with data #6 and, accordingly, these data are culled. This facilitates the generation of mesh data in overlap meshes. In addition, since even node information made invalid can easily be restored to valid information, an error-free data update can be executed with ease.

-Level Correspondence Data-

FIG. 13 shows the mesh set data constituting the level correspondence data. The level correspondence data are stored in the recording medium 2 in the form of the data block shown in FIG. 13. They are stored in succession after the mesh set data constituting the connection/partial restriction data in FIG. 9. The contents of the data corresponding to the individual data numbers are similar to those explained in reference to FIG. 9.

FIG. 14 shows the contents of a given set of reference mesh data in the level correspondence data. The mesh code, the mesh identification information, the core mesh identification information and the offset information assigned with data #1 through #4 are similar to those explained in reference to FIG. 10. Data #5 is the level correspondence data.

FIG. 15 shows in detail the level correspondence data assigned with data #5 in FIG. 14. Data #1 is a level correspondence header. Data #2 indicates the number of corresponding levels. The maximum number of corresponding lower-order levels is set as data #2. Data #2 indicates the maximum range over which the correspondence of lower-level nodes (their positions) to a subject level node is indicated. The number of (lower order) levels whose correspondence to the subject level is to be indicated is set in data #2. Data #3 through #7 are correspondence information. n sets of correspondence information matching the number of nodes (n) deemed necessary for editing purposes that are present in the mesh at the subject level are provided.

FIG. 16 shows in detail a set of correspondence information. Data #1 is correspondence information of the subject node, and data #2 through #7 are correspondence information with regard to adjacent nodes connecting with the subject node. In the example presented in FIG. 16, m nodes connect with the subject node. FIG. 17 shows in detail the subject node correspondence information. As data #1, the number of adjacent nodes connecting with the subject node is entered. The value m is entered in correspondence to the subject node in FIG. 16. Data #2 is subject level information. The node number assigned to the subject node at the subject level is entered as data #2. Data #3 through #6 are lower-order level information. The number of sets of lower-order level information matches the number of corresponding levels set as data #2 in FIG. 15, and the sets of lower-order level information are provided sequentially, starting with the lower-order level information at the closest level to the subject level. Each set of lower-order level information contains data indicating the area at which the subject node is present at the lower-order level and the node number assigned to the subject node at the lower-order level. The data indicating the area at which the subject node is present are information that enables identification of the block and the reference mesh containing the node.

FIG. 18 shows in detail a given set of adjacent node correspondence information. As data #1, the node number assigned at the subject level to a node adjacent to the subject node is entered. Data #2 through #5 are lower-order level adjacency information. The number of sets of lower-order level adjacency information matches the number of corresponding levels set as data #2 in FIG. 15, and the individual sets of lower-order level adjacency information are provided sequentially starting with the lower-order level information at the closest level to the subject level. Each set of lower-order level adjacency information contains data indicating the area at which the node adjacent to the subject node is present at the lower-order level and the node number assigned to the subject node at the lower-order level.

-Route Information Lists-

The following is an explanation of route information lists. A route information list is a list of routes between specific mesh sets which are calculated in advance. Namely, a route calculation (route search) is executed in advance to determine routes between nodes contained in a given mesh set, and nodes contained in another mesh set and the routes with the smallest costs are selected and listed. The "costs" in this context refer to values calculated by taking into consideration the lengths of the routes and other conditions.

In principle, the number of route information lists that can be prepared matches the number of all the possible combinations of mesh sets at a given level. However, if route information lists were prepared in the quantity matching the number of all the possible combinations of mesh sets at a lower-order level, i.e., at a level at which detailed map data are provided, the length of time required for the processing would be considerable and the volume of the output route information list data would be extremely large. Accordingly, a route information list is created only if the distance between the lower left reference meshes in the core meshes of a given pair of mesh sets is equal to or smaller than a predetermined value. For instance, a route information lists may be created for each pair of mesh sets with the distance between the lower left reference meshes equal to or less than 40 km at level 1, whereas route information lists may be prepared in the quantity matching the number of all possible combinations of mesh sets at level 2. In addition, such conditions for route information list creation may be altered as necessary.

By using route information lists created as described above, the length of time required for route calculation is greatly reduced. In order to enable the use of route information lists, the reference mesh data include the route information list identification information corresponding to data #4 in FIG. 10. The route information list identification information is now explained in further detail.

FIG. 19 presents an illustration of route information list identification information, provided to facilitate an explanation thereof. It is to be assumed that a core mesh x in FIG. 19(a) is a subject core mesh, that no route information list is provided for the core mesh x and a core mesh d and route information lists have been created for the core mesh x and a core mesh a, for the core mesh x and a core mesh c, for the core mesh x and a core mesh e and for the core mesh x and a core mesh b. Under such circumstances mesh data shown in FIG. 19(b) are provided as mesh data of a reference mesh A in the core mesh x. As the route information list identification information assigned with data #4, information indicating the relationships with reference meshes adjacent to the subject reference mesh on the upper side, the lower side, the left side and the right side is entered.

More specifically, the reference mesh on the upper side of the reference mesh A is contained in the core mesh d, and since no route information list is provided for the core mesh x and the core mesh d, data indicating that there is no route information list are entered. The reference mesh on the lower side of the reference mesh A is contained in the subject core mesh itself, and accordingly NULL indicating that the lower-side reference mesh is part of the subject core mesh is entered. The reference mesh on the left side of the reference mesh A, too, is contained in the subject core mesh, and thus, NULL indicating that the left side reference mesh is part of the subject core mesh is entered. The reference mesh on the right side of the reference mesh A is contained in the core mesh e, and since a route information list is provided for the core mesh x and the core mesh d, data indicating that there is a route information lists available with regard to the core mesh x and the core mesh e are entered. If a route information list is available, a pointer is also entered to enable referencing of the route information list. Likewise, a reference mesh B in the core mesh x contains mesh data shown in FIG. 19(c).

By referencing the data provided as the route information list identification information in the mesh data in the subject reference mesh, as described above, it is possible to judge whether or not route information lists for the subject reference mesh and adjacent reference meshes are available. Then, if there is a route information list, the length of time required for the route calculation can be reduced by taking in the route information list. Namely, by taking in the precalculated route information, the need to execute route calculation through the Dykstra method or the like every time is eliminated and thus, a reduction in the length of time required for the route calculation is achieved.

-Correlating Mesh Sets at Different Levels-

As explained earlier, the map data are divided into seven different levels of data, each corresponding to a specific scaling factor, and the map data are managed with the level of data corresponding to the scaling factor on the most detailed side designated as level 0 and the level of the map data on the widest range side designated as level 6 in the embodiment. The route calculation data are provided as part of level 1 data, level 2 data and level 4 data. As the current position is detected and a destination is specified, the route calculation is executed to determine a route between the current position and the destination.

If the current position is detected and a destination is set in a map displayed by using the map data at level 1 and the current position and the destination are both contained in a single core mesh at level 1, the route calculation is executed by using the route calculation data in the reference meshes contained in the core mesh. In addition, if the current position and the destination are contained in adjacent core meshes, too, the route is basically calculated by using the route calculation data in the reference meshes in the adjacent core meshes at the same level.

However, if the core mesh containing the current position and the core mesh containing the destination are located over a significant distance from each other at level 1, the route calculation data at the higher-order level 2 are used to calculate the intermediate route. In addition, if the distance between the core meshes containing the current position and the destination is significant at the higher-order level 2, too, the intermediate route is calculated by using the route calculation data at the higher-order level 4. Since the intermediate route is calculated with the route calculation data at the higher-order level with a smaller volume in this manner, the length of time required to execute the route calculation processing is reduced. However, if a route information list explained earlier is available for any pair of mesh sets, the route information list is used in the processing. For instance, if the distance between the mesh sets is equal to or less than 40 km and a route information list for the mesh sets is available as described earlier, the route information list is used in the processing even when the corresponding core meshes are far from each other.

If no route information list is available at level 1, the data in the mesh set containing the current position are used to execute the route calculation through the Dykstra method or the like. Then, as the route reaches a node in the overlap mesh, the route calculation is continuously executed by switching the data level to the higher-order level, i.e., level 2. Similar processing is executed on the destination side. Since, in principle, there should be route information lists available at level 2, the route requiring the least cost between the mesh set on the current position side and the mesh set on the destination side is selected at the higher-order level 2. If, on the other hand, no route information list is available, the route calculation is executed with the mesh set data in the mesh sets at level 2. In addition, the data level is switched to the higher-order level 4 at an overlap mesh and the route calculation is executed with the route calculation data at level 4, as necessary. By executing the route calculation in this manner, the optimal route to follow from the current position to the destination can be determined.

In the explanation given above, the expression "is switched to the higher-order level at an overlap mesh at the lower-order level" is used. The data level is raised to the higher-order level by identifying the node at the higher-order level corresponding to the node at the lower-order level, and once such a higher-order level node is identified, the route calculation is continuously executed from the higher-order level node. In order to be able to identify the higher-order level node, the correspondence between the lower-order level node and the higher-order level node must be ascertained. Such correspondence can be determined based upon the correlation (parentage) between the mesh set at the lower-order level and the mesh set at the higher-order level. In the embodiment, this correlation is ascertained by referencing the file management table mentioned earlier, which is provided to manage the mesh set data.

The correlation between mesh sets at different levels (with the level difference by a single level or two or more levels) is determined by identifying the core mesh formed with a higher-order level reference mesh present at the position at which the lower left reference mesh in the core mesh at the lower-order level is projected onto the higher-order level data.

Figure 20:
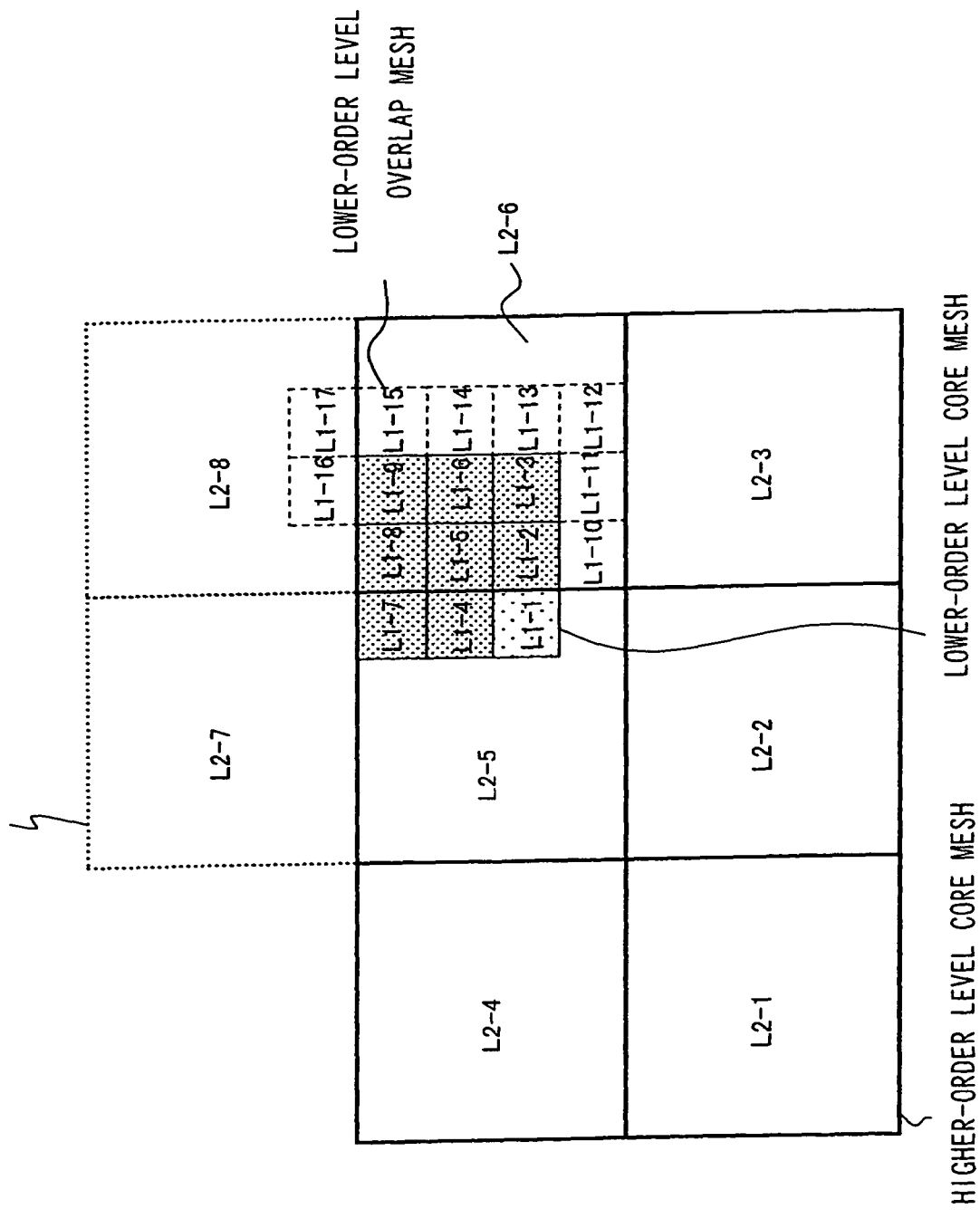
FIG. 20 illustrates how mesh sets at different levels are made to correlate with each other.

FIG. 20 illustrates the correlation between mesh sets at different levels. Reference meshes L1-1 through L1-17 constitute a given mesh set at level 1. Of these reference meshes, the reference meshes L1-1 through L1-9 form the core mesh and the reference meshes L1-10 through L1-17 form the overlap mesh. Reference meshes L2-1 through L2-8 constitute a given mesh set at level 2. Of these reference meshes, the reference meshes L2-1 through L2-6 form the core mesh and the reference meshes L2-7 and L2-8 form the overlap mesh.

The lower left reference mesh L1-1 at the lower-order level is contained in the reference mesh L2-5 at the higher-order level, and accordingly, the file management table is referenced to determine the lower left reference mesh in the core mesh at the higher-order level containing the reference mesh L2-5. Thus, it is possible to read the reference mesh in the core mesh at the higher-order level.

In more specific terms, the processing is executed through the following procedure.

(1) The relative number assigned to the lower left reference mesh L1-1 itself is known. Thus, the latitude/longitude information with regard to the lower left reference mesh L1-1 can be obtained through calculation.

(2) Once the latitude/longitude information regarding the lower left reference mesh L1-1 is obtained, the specific block containing the lower left reference mesh can be ascertained by referencing the block management table at the higher-order level 2.

(3) Once the block is identified, the mesh management table corresponding to the block can be referenced.

(4) Then, by referencing the file management table in the mesh management table, the specific mesh set and core mesh containing the lower left reference mesh L1-1 can be determined based upon the latitude/longitude information of the lower left reference mesh L1-1.

The correlation between mesh sets at different levels is thus determined.

Once the correlation between the mesh sets at the different levels is ascertained, the corresponding nodes at the different levels can be identified by searching the level correspondence data in the mesh data contained in the reference mesh in the subject mesh set at the higher-order level 2. Once the node at the higher-order level 2 corresponding to the node at the lower-order level 1 is identified as described above, the route calculation can be executed by switching from the lower-order level 1 to the higher-order level 2.

As described earlier, the node correspondence is determined in reference to the specific core set at the higher-order level containing the lower left reference mesh in the core set at the lower-order level. Accordingly, it is theoretically possible that a core mesh at the lower-order level is set over a boundary of core meshes at the higher-order level. However, in principle, the core mesh at the lower-order level should be set within a core mesh at the higher-order level so as to ensure that the entire core mesh at the lower-order level is contained inside a single core mesh at the higher-order level.

-Use of Overlap Meshes-

In the embodiment, the data level is switched from the lower-order level to the higher-order level at the overlap mesh in the mesh set at the lower-order level. Namely, the route is calculated through the mesh set at the lower-order level until the route reaches a node in the overlap mesh. Then, the node at the higher-order level corresponding to the node in the overlap mesh is determined through the method described above, and the route calculation is resumed starting with the corresponding node at the higher-order level.

By taking these measures, the data volume of the overlap mesh data can be reduced, the load of the route calculation can be reduced and furthermore, the load of the calculation executed to determine the correspondence with a higher-order level can be reduced, since the overlap data only need to include data that can be used for a long-distance search as route calculation data for achieving a link with the higher-order level data when executing the route calculation by linking with the higher-order level data. Thus, a reduction is achieved in the length of time required for the route calculation.

As described earlier, the mesh data in each reference mesh constituting the overlap mesh are generated by culling or reducing the mesh data in the matching reference mesh at the same position that constitutes a core mesh. In the example presented in FIG. 12, an invalid node flag is provided for the subject node information. Instead, information corresponding to nodes needed in the overlap mesh alone may be directly generated without setting such a flag to reduce the volume of the mesh data in the overlap mesh.

A reference mesh at a given position may be part of the overlap meshes in different mesh sets. In such a case, different mesh data are generated for the individual overlap meshes, each set of data in correspondence to one of the mesh sets. Namely, a given set of overlap mesh data is generated by leaving in place only the nodes necessary in correspondence to the link with the core mesh. Accordingly, different route calculation data may are generated as overlap mesh data at a given position, depending upon the specific core mesh adjacent to which the overlap mesh. However, it goes without saying that the identical route calculation data may be generated as overlap mesh data for a given position in correspondence to different overlap meshes.

There are various methods that may be adopted when generating the mesh data in overlap meshes, e.g., leaving only the nodes on major roads extending from the core meshes such as arteries and express highways in place. Such mesh data may be generated manually based upon past experience in route calculation data generation, or data achieving the maximum extent of efficiency may be generated through computer simulation. Alternatively, they may be automatically generated in conformance to specific rules based upon the types of individual roads. In addition, the overlap mesh data may be generated by leaving intact the information corresponding to links needed in the specifications in the core mesh data, leaving only the subject node information in each unnecessary link and deleting the adjacent node information in the unnecessary link.

-Map Data Update Management in the Navigation System-

Figure 21:
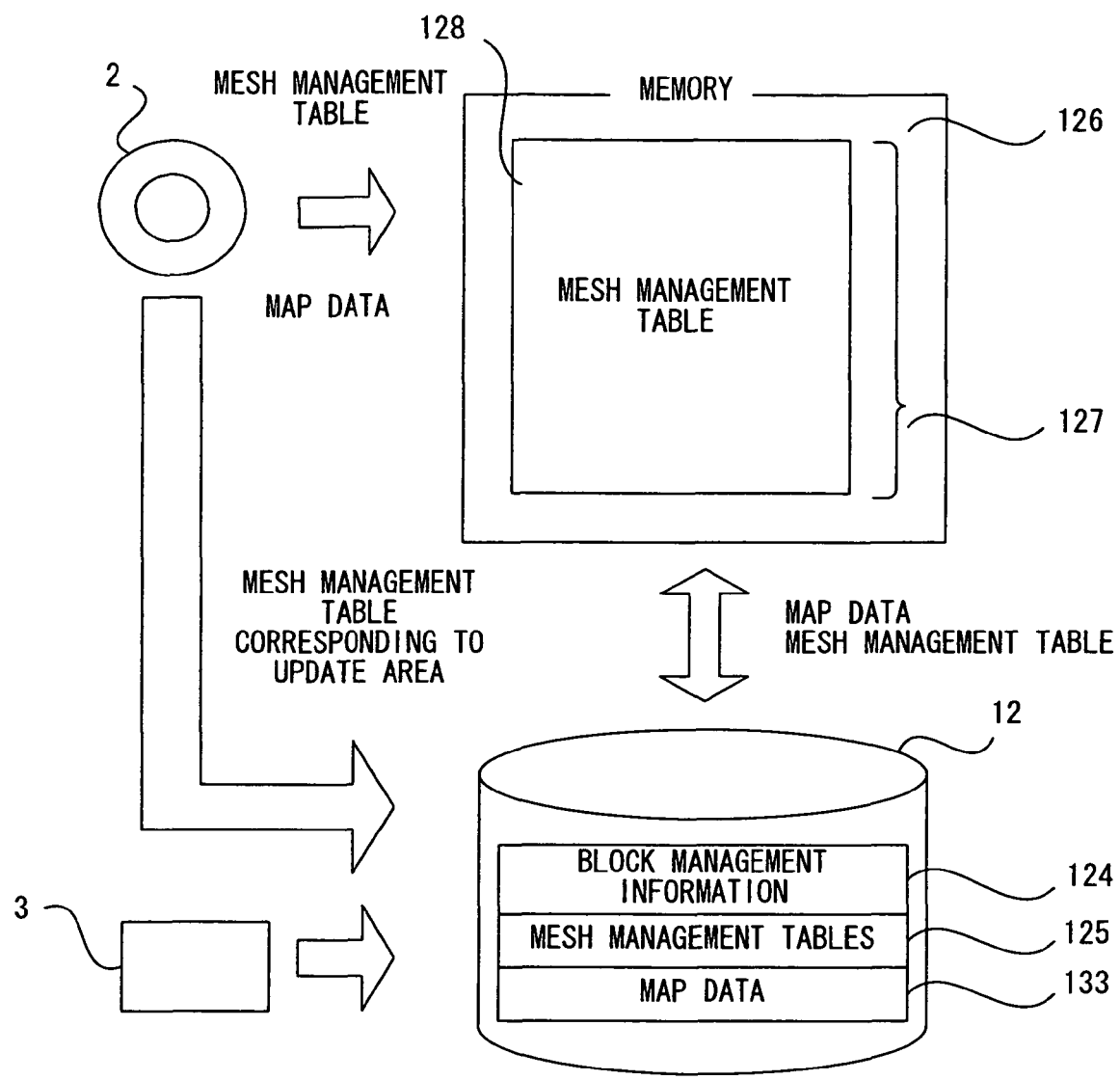
FIG. 21 illustrates how an update management of map data may be achieved in the navigation system.

FIG. 21 illustrates how update management of map data is achieved in the navigation system 1. The navigation system 1 in the embodiment is capable of updating map data such as route calculation data in units of the individual mesh sets explained above. The navigation system 1, which reads mesh management tables and map data from the recording medium 2 and reads update map data from the removable memory 3 or from the map server 6 via the Internet 5, is able to use the latest version of map data.

A navigation system in the related art reads data from a recording medium such as a CD-ROM or a DVD-ROM alone. The navigation system achieved in the embodiment, on the other hand, uses the map data in the recording medium 2 and updated map data in combination. For this reason, it includes the nonvolatile memory 12 which is a read/write medium. The nonvolatile memory 12 is constituted of a hard disk, a flash memory or the like, and data held in the nonvolatile memory 12 are retained even when the power to the navigation system is turned off. The nonvolatile memory 12 may be referred to as a cache medium 12, as well.

In the nonvolatile memory 12, the block management tables 124 explained earlier in reference to FIG. 6 are stored. Each block management table 124 contains the identification information used to determine whether the mesh management table of a given block is in the recording medium 2 or in the nonvolatile memory 12 and the access address of the mesh management table. Before new map data are used for the first time, the block management tables stored in the recording medium 2 are read into the nonvolatile memory 12. The block management tables are each initially at a value that indicates that the mesh management tables corresponding to the individual blocks are stored in the recording medium 2. Subsequently, as map data are updated in units of mesh sets, a mesh management table 125 is created in the nonvolatile memory 12 for the block containing the updated mesh and the corresponding block management table 124 is set so as to indicate that the mesh management table of that particular block is now available in the nonvolatile memory 12. The program references the block management table 124 to ascertain whether or not the mesh management table is stored in the recording medium 2 or in the nonvolatile memory 12.

Reference numeral 126 indicates a memory area inside the memory 15 of the navigation system used for mesh management table storage. Hereafter, it is referred to as the memory 126. After judging whether the subject mesh management table is available in the recording medium 2 or in the nonvolatile memory 12, the program reads out the mesh management table from the correct medium and stores the mesh management table thus read out into the memory 126. The mesh management table 127 read into the memory 126 contains the mesh management information explained earlier in reference to FIGS. 7 and 8.

As map data are updated in units of mesh sets in the removable memory 3, the map data in the updated mesh set are read into the nonvolatile memory 12 and are stored as map data 133. At this time, information indicating that the mesh set data in this mesh set are stored in the nonvolatile memory 12 and the address of the mesh set data is written as data #9 "storage location" corresponding to the particular mesh set in the mesh management table in the nonvolatile memory 12. In addition, if the data size of the mesh set data has been altered, the contents of data # 10 and #11 are overwritten. There is no particular need to rewrite the other data because of the update. Subsequently, the nonvolatile memory 12 can be accessed based upon these data contents. Namely, the map data in mesh sets that have not been updated can be obtained by accessing the recording medium 2, and the map data in updated mesh sets can be obtained by accessing the nonvolatile memory 12.

-Flowcharts of Route Calculation Control-

Figure 22:
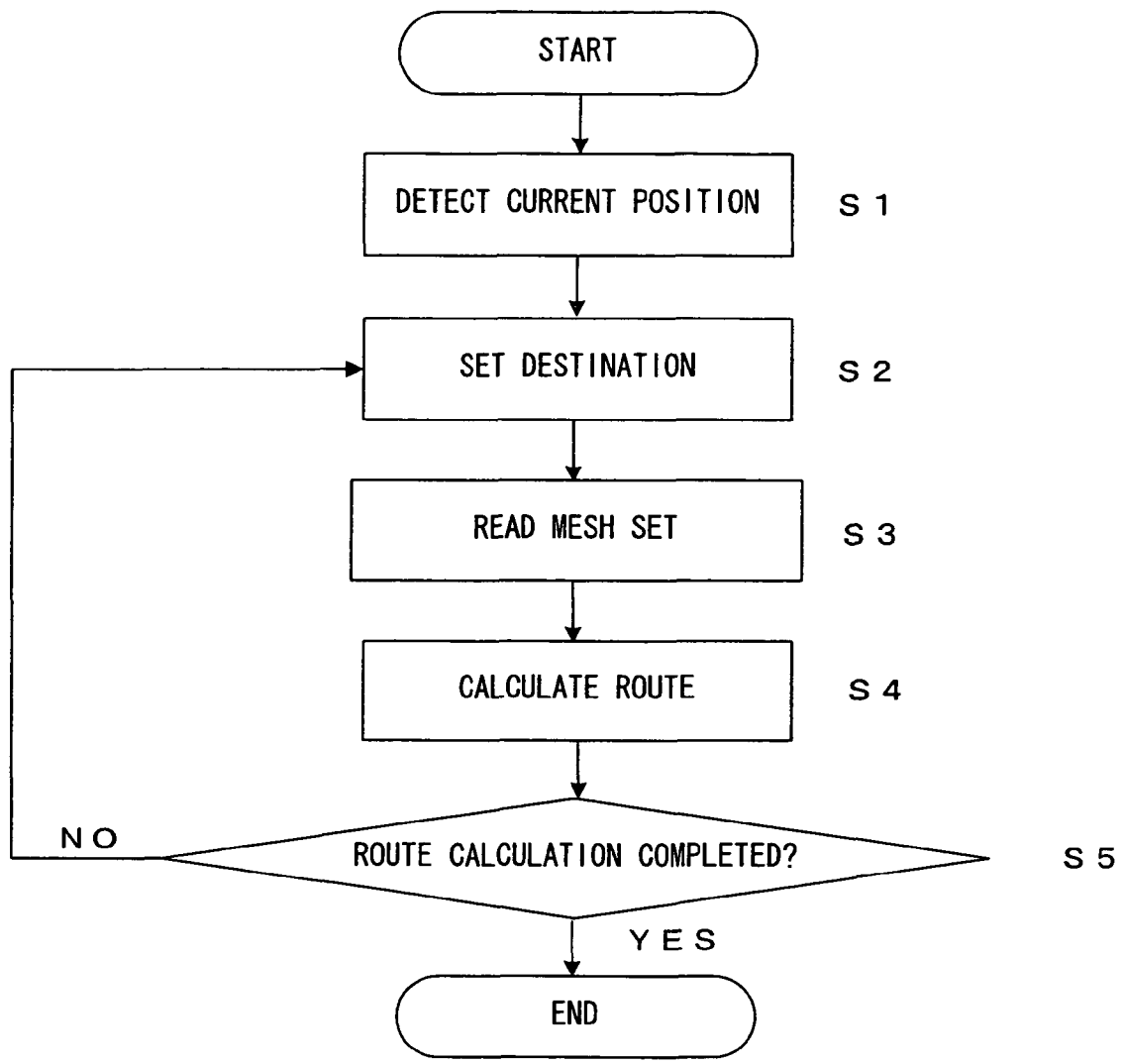
FIG. 22 presents a flowchart of the control under which a route calculation is executed by reading route calculation data.

FIG. 22 presents a flowchart of the control under which the route calculation is executed by the control device 11 by reading route calculation data. In step S1, the current position detection device 13 is engaged to detect the current position of the vehicle. In step S2, the destination specified by the user through the input device 19 is set. In step S3, mesh set data in the necessary mesh set around the current vehicle position or the destination are read. In step S4, the route calculation (route search) is executed through the Dykstra method or the like. In step S5, a decision is made as to whether or not the entire route has been calculated. Namely, a decision is made as to whether or not the entire route from the current position to the destination has been calculated. If it is decided in step S5 that the route calculation has not been completed, the operation returns to step S3, to read the mesh set data in another necessary mesh set so as to continue with the route calculation. Once it is decided in step S5 that the route calculation has been completed, the processing ends. While the processing in steps S3 through S5 is repeatedly executed, the data at the lower-order level are connected with the corresponding data at the higher-order level as necessary, as described earlier.

Figure 23:
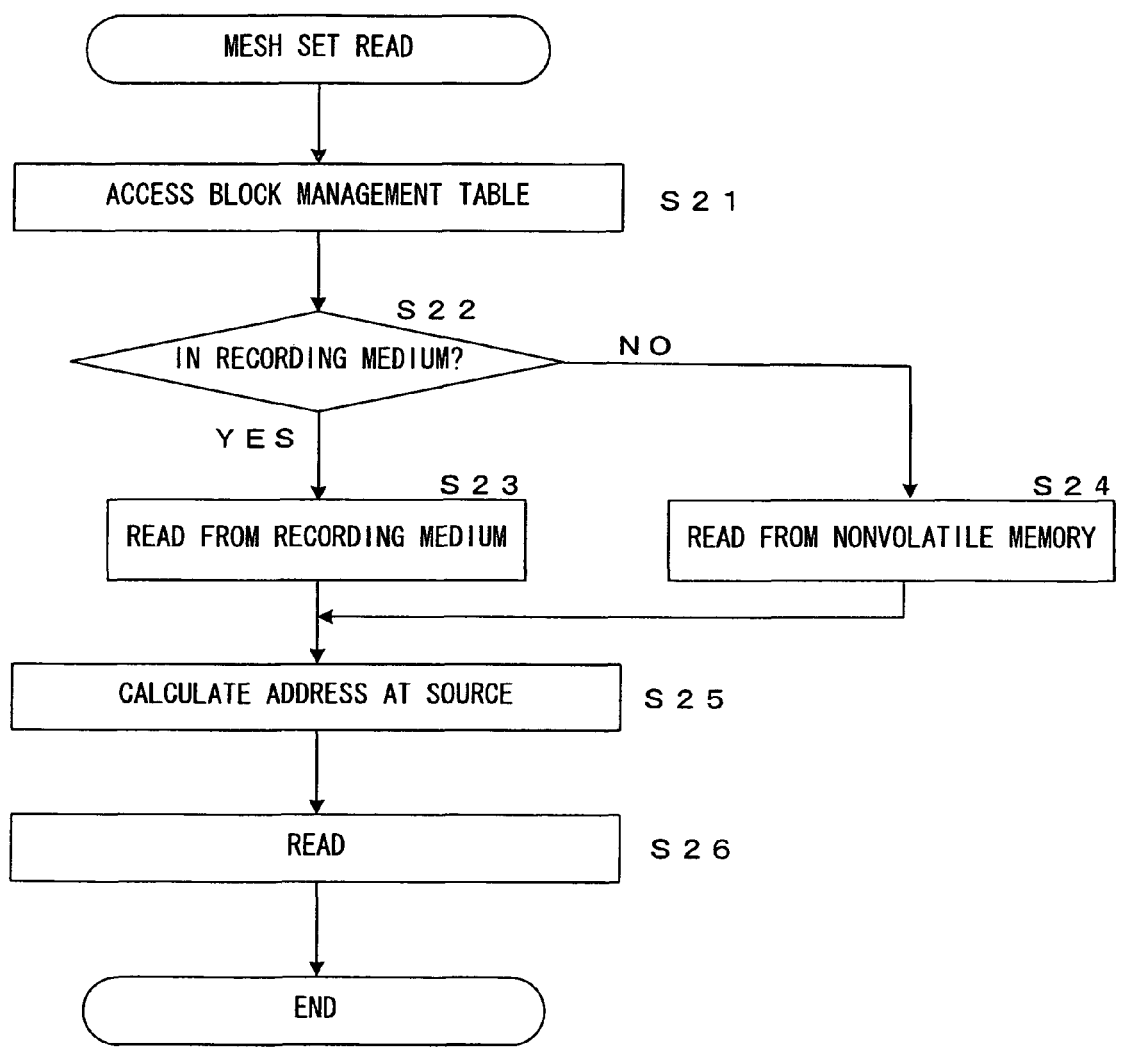
FIG. 23 presents a detailed flowchart of the processing executed in step S3 in FIG. 22.

FIG. 23 is a detailed flowchart of the processing executed in step S3 in FIG. 22. In step S21, the block management table in the nonvolatile memory 12 is accessed as explained earlier. It is assumed that the block management table has already been read into the nonvolatile memory 12 by this time. In step S22, a decision is made as to whether or not the file management table corresponding to the subject block is in the recording medium 2 or in the nonvolatile memory 12 based upon the contents of the block management table. If it is decided in step S22 that the file management table is available in the recording medium 2, the operation proceeds to step S23. In step S23, the file management table corresponding to the subject block is read from the recording medium 2 into the memory 126.

If, on the other hand, it is decided in step S22 that the file management table is not available in the recording medium 2, i.e., that the file management table is in the nonvolatile memory 12, the operation proceeds to step S24. In step S24, the file management table corresponding to the subject block is read from the nonvolatile memory 12 into the memory 126. In step S25, the address at which the subject mesh set data are stored is calculated based upon the contents of the file management table read into the memory 126. In step S26, the mesh set data are read from the calculated storage address. In this situation, if the mesh set data has not been updated, the data are read from the recording medium 2 in units of the individual mesh sets. If, on the other hand, the mesh set data have been updated, the data are read from the nonvolatile memory 12.

The following advantages are achieved by adopting the map data structure and the navigation system realized in the embodiment.

(1) The route calculation data stored in the recording medium 2 are managed in units of individual mesh sets each constituted with a plurality of reference meshes. As a result, blocks of data optimal for the route calculation can be successively read out from the recording medium 2. Since this reduces the number of seeks that the read head of the DVD drive device must undertake compared to the number of seeks that the read head would have to undertake when reading out individual sets of data managed in units of meshes, faster processing is realized.

(2) By connecting lower-order level data with the corresponding higher-order level data based upon the concept of "overlap meshes", the length of time required to execute the route calculation processing can be reduced.

(3) An invalid flag is provided to be used when creating overlap mesh data so as to facilitate the management of the overlap mesh data generation.

(4) File management tables are provided to be used to manage mesh sets. As a result, the corresponding mesh sets at different levels can be correlated (the parentage of a given mesh set can be ascertained) by referencing file management tables. In addition, no other special table needs to be provided.

(5) Since map data such as route calculation data can be updated in units of individual mesh sets, the entire recording medium, such as a DVD-ROM, in which the map data are stored, does not need to be replaced with a new recording medium each time the map data are partially updated. Since the minimum data update units are mesh sets, data that do not need to be updated are not updated and thus, the volume of data that are actually communicated (the communication cost) can be minimized.

(6) Since update data can also be provided through communication via the Internet, the latest version of update data can be made available quickly at low cost.

(7) The use of route information lists prepared in advance greatly reduces the length of time required for the route calculation.

(8) Since the map data are managed by storing the mesh management tables in the nonvolatile memory, the update data can be managed easily and reliably. As a result, program development for navigation systems and the like are facilitated.

(9) Since the update data for an area selected by the user are delivered and the user does not receive the update data for the entire nation delivered in a batch, the length of time required for the data reception is minimized. In addition, since the entire map data are not recorded into a large-capacity read/write storage device, a storage capacity that allows only the update data requested by the user to be stored will suffice.

While an explanation is given above in reference to the embodiment on an example in which the control program executed by the control device 11 of the navigation system is stored in a ROM, the present invention is not limited to this example. The control program and an installation program used to install the control program may be provided in a recording medium such as a DVD. It is to be noted that the recording medium does not need to be a DVD, and instead, it may be any of various types of recording media including a CD-ROM and magnetic tape.

In addition, these programs may be provided via a transmission medium such as a communication line, a typical example of which is the Internet. Namely, the programs may be converted to signals on a carrier wave through which a transmission medium is carried. When providing the programs in a recording medium or via the Internet, they can be provided to the navigation system in a configuration identical to that shown in FIG. 1. For instance, the recording medium 2 may be used as a recording medium in which the programs are provided and the map server 6 may be used as a server that provides the application program. Thus, the programs can be distributed as a computer-readable computer program product adopting any of various modes such as a recording medium and a carrier wave.

Furthermore, a car navigation system may be achieved by executing the control program described above on a personal computer. In such a case, the current position detection device 13, the input device 19 and the like should be connected to specific I/O ports or the like of the personal computer.

While an explanation is given above in reference to the embodiment on an example in which update data are provided from the removable memory 3, the present invention is not limited to this example. Instead, update data may be written into a CD-ROM or a DVD-ROM and then be provided by temporarily replacing the recording medium 2 with the CD-ROM or the DVD-ROM.

While an explanation is given above in reference to the embodiment on an example in which the initial map data are read from the recording medium 2, the present invention is not limited to this example. The initial map data may be received via the Internet 5, and stored into the non-volatile memory 12. Then the data may be managed as they are updated by adopting the method described earlier. In addition, individual sets of map data may be received via the Internet as they become needed, the received map data may be stored into the non-volatile memory 12 each time, and they may be updated and managed through the method described earlier whenever it becomes necessary to update them. Thus, the map data can be distributed as a computer-readable map data product that can be read into a computer or a navigation system adopting any of various modes such as a recording medium and a carrier wave.

An explanation is given above in reference to the embodiment on an example in which the route calculation data are managed by handling them in units of individual mesh sets. In addition, it is explained above that the map display data do not need to be managed by adopting the concept of "mesh sets". However, it goes without saying that the map display data, too, may be managed in units of "mesh sets". While it is not as effective as the route calculation data to manage the map display data in units of mesh sets, a higher speed may still be achieved in processing as data are read. The concept of "mesh sets" may also be adopted in conjunction with other types of map data.

While an explanation is given above in reference to the embodiment on an example in which the nonvolatile memory 12 is installed inside the navigation system 1, the present invention is not limited to this example and the nonvolatile memory 12 may instead be an external storage device which is connected through a cable or the like.

While the invention has been particularly shown and described with respect to a preferred embodiment thereof by referring to the attached drawings, the present invention is not limited to these examples and it will be understood by those skilled in the art that various changes in form and detail may be made therein without departing from the spirit, scope and teaching of the invention.

The invention claimed is:

1. A map data processing apparatus, comprising:
a recording medium drive unit that reads out map data from a recording medium that contains the map data that includes map-related information related to a map; and
a processing unit that executes map data processing based upon the map data read out by the recording medium drive unit, wherein:
the map data includes a structure achieved by dividing the map into a plurality of mesh-like subdivisions and dividing the map-related information into units corresponding to the individual subdivisions, and a structure in which the map-related information is managed in units of subdivision sets each containing a plurality of adjacent subdivisions and the map-related information is used in the map data processing apparatus in units of the individual subdivision sets;
the subdivision sets are each constituted with a core portion having at least one subdivision that does not overlap with another subdivision set and an overlap portion having at least one subdivision that is part of a core portion of another subdivision set;
the map-related information is route-related information related to routes on the map used for route calculation;
intersection points of road are designated as nodes;
the route-related information comprises sets of subject node information each corresponding to one of a plurality of nodes present on each road and sets of adjacent node information corresponding to nodes connecting with individual subject nodes;
the route-related information corresponding to the core portion comprises the subject node information and the adjacent node information; and
the route-related information corresponding to the overlap portion is generated by eliminating the adjacent node information corresponding to specific nodes from the route-related information corresponding to the core portion.

2. A map data processing apparatus according to claim 1, wherein:
the map-related information corresponding to each of the subdivision sets is continuously recorded on a recording medium as a single block of information.

3. A map data processing apparatus according to claim 1, wherein:
the map-related information adopts a structure that allows the map-related information to be used in the map data processing apparatus also in units of the individual subdivisions.

4. A map data processing apparatus according to claim 1, wherein:
the map data further comprises a structure that contains management information used to manage the map-related information in units of the subdivision sets; and
the processing unit updates the map-related information obtained by the recording medium drive unit in units of the subdivision sets by using the management information.

5. A map data processing apparatus according to claim 1, wherein:
the core portion has a rectangular shape; and
the overlap portion is adjacent to the core portion.

6. A map data processing apparatus, comprising:
a recording medium drive unit that reads out map data from a recording medium that contains the map data that includes map-related information related to a map; and
a processing unit that executes map data processing based upon the map data read out by the recording medium drive unit, wherein:
the map data includes a structure in which the map-related information is provided at a plurality of levels each corresponding to one of various scaling factors, a structure achieved by dividing the map into a plurality of mesh-like subdivisions and dividing the map-related information divided into units corresponding to the individual subdivisions, at each level; a structure in which the map-related information is managed in units of subdivision sets each containing a plurality of adjacent subdivisions and the map-related information is used in the map data processing apparatus in units of the individual subdivision sets, and a structure in which management tables containing information used to manage the subdivision sets at the individual levels are provided;
the management tables contain information used in an arithmetic operation executed to determine correspondence between subdivision sets at different levels;
intersection points of roads on the map are designated as nodes;
the map-related information contains information related to the nodes;
the map-related information divided in correspondence to each subdivision unit further contains different level node correspondence information indicating correspondence between nodes in the subdivision and corresponding nodes at another level; and
the processing unit executes map data processing by ascertaining the correspondence between nodes at different levels based upon correspondence between the subdivision set and a subdivision set at the other level and the different level node correspondence information for subdivisions constituting the subdivision set.

7. A map data processing apparatus according to claim 6, wherein:
the management tables each contain information indicating a position of a reference subdivision representing a given subdivision set in combination with information related to a quantity of subdivisions contained in the subdivision set along a vertical direction and information related to a quantity of subdivisions contained in the subdivision set along the horizontal direction.

8. A map data processing apparatus according to claim 7, wherein:
the subdivision set has a rectangular shape; and
the reference subdivision representing the subdivision set is a subdivision located at a lower left position in the subdivision set.

9. A map data processing apparatus according to claim 8, wherein:
sets of the information used to manage the subdivision sets are stored sequentially in an order corresponding to a positional arrangement of reference subdivisions representing the individual subdivision sets in reference to the horizontal direction and the vertical direction along which the map is divided.

10. A map data processing apparatus according to claim 6, wherein:
the map is divided into a plurality of mesh-like blocks at each of the levels;
the plurality of subdivisions are subdivisions obtained by further dividing each of the blocks into smaller partitions; and
the management tables are provided each in correspondence to one of the blocks.

11. A map data processing apparatus according to claim 6, wherein:
the processing unit updates the map-related information obtained by the recording medium drive unit in units of the individual subdivision sets by using the management tables.

12. A map data processing apparatus, comprising:
a recording medium drive unit that reads out map data from a recording medium that contains the map data that includes map-related information related to a map; and
a processing unit that executes map data processing based upon the map data read out by the recording medium drive unit, wherein:
the map data includes a structure achieved by dividing the map into a plurality of mesh-like subdivisions and dividing the map-related information into units corresponding to the individual subdivisions, and a structure in which the map-related information is managed in units of subdivision sets each containing a plurality of adjacent subdivisions and the map-related information is used in the map data processing apparatus in units of the individual subdivision sets;
the subdivision sets are each constituted with a core portion having a plurality of subdivisions that do not overlap with another subdivision set and an overlap portion having at least one subdivision that is part of a core portion of another subdivision set;
the map data further comprises a structure that contains management information used to manage the map-related information in units of the subdivision sets;
the management information includes information related to a position of a specific subdivision of a core portion, information related to a number of subdivisions set along a latitudinal direction and a longitudinal direction in a core portion, information related to a position of a specific subdivision of a subdivision set, and information related to a number of subdivisions set along a latitudinal direction and a longitudinal direction in a subdivision set;

the map-related information corresponding to each of the subdivision sets is continuously recorded on the recording medium as a single block of information;

the recording medium drive unit continuously reads out the map-related information in units of the subdivision sets from the recording medium by using the management information; and the processing unit executes map data processing based upon the map-related information read out in units of the subdivision sets from the recording medium by the recording medium drive unit.

* * * * *